(12) United States Patent
Roelse et al.

(10) Patent No.: US 10,333,702 B2
(45) Date of Patent: Jun. 25, 2019

(54) UPDATING KEY INFORMATION

(75) Inventors: Peter Roelse, Hoofddorp (NL); Yoni De Mulder, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 737 days.

(21) Appl. No.: 14/386,669

(22) PCT Filed: Mar. 20, 2012

(86) PCT No.: PCT/EP2012/054923
§ 371 (c)(1),
(2), (4) Date: Feb. 2, 2015

(87) PCT Pub. No.: WO2013/139380
PCT Pub. Date: Sep. 26, 2013

(65) Prior Publication Data
US 2015/0163054 A1 Jun. 11, 2015

(51) Int. Cl.
*H04L 9/08* (2006.01)
*H04L 9/06* (2006.01)
*H04L 29/06* (2006.01)

(52) U.S. Cl.
CPC ............. *H04L 9/0838* (2013.01); *H04L 9/06* (2013.01); *H04L 9/0631* (2013.01);
(Continued)

(58) Field of Classification Search
CPC ... H04L 9/002; H04L 2209/16; H04L 9/0618; H04L 25/4915; H04L 9/06;
(Continued)

(56) References Cited

U.S. PATENT DOCUMENTS

2010/0296649 A1* 11/2010 Katzenbeisser ......... G06F 21/10
380/28
2011/0067012 A1* 3/2011 Eisen ........................ G06F 8/51
717/140

(Continued)

FOREIGN PATENT DOCUMENTS

CN 101884195 A 11/2010
CN 102047220 A 5/2011

(Continued)

OTHER PUBLICATIONS

Extended European Search Report cited in corresponding European Application No. 12712090.5 dated Oct. 18, 2016.

(Continued)

*Primary Examiner* — Farid Homayounmehr
*Assistant Examiner* — Lizbeth Torres-Diaz
(74) *Attorney, Agent, or Firm* — Rimon PC; Marc S. Kaufman

(57) ABSTRACT

A method of providing key information from a sender to one or more receivers, the method comprising: obtaining initial key information comprising a plurality of units that assume respective values; forming encoded key information from the initial key information, wherein the encoded key information comprises a plurality of encoded units that correspond to respective units of the initial key information, wherein said forming comprises, for each unit of the initial key information, selecting an encoding from a plurality of invertible encodings associated with said unit and encoding said value assumed by said unit with said selected encoding to form the corresponding encoded unit; and providing the encoded key information to said one or more receivers.

11 Claims, 11 Drawing Sheets

(52) U.S. Cl.
CPC ...... *H04L 63/0435* (2013.01); *H04L 2209/16* (2013.01); *H04L 2209/24* (2013.01)

(58) Field of Classification Search
CPC ..... H04L 2209/24; G06F 21/10; G06F 21/14; G06F 21/57; G06F 2207/7219
See application file for complete search history.

(56) References Cited

U.S. PATENT DOCUMENTS

| | | | | |
|---|---|---|---|---|
| 2014/0019771 | A1* | 1/2014 | Emmett | H04L 9/002 713/189 |
| 2017/0033922 | A1* | 2/2017 | Michiels | G06F 21/14 |

FOREIGN PATENT DOCUMENTS

| | | | | |
|---|---|---|---|---|
| CN | 104322002 | B | 3/2018 | |
| EP | 2369778 | A1 | 9/2011 | |
| EP | 2 829 010 | A1 | 1/2015 | |
| WO | 2008142612 | A2 | 11/2008 | |
| WO | 2009034504 | A2 | 3/2009 | |
| WO | 2009140774 | A1 | 11/2009 | |
| WO | 2010102960 | A1 | 9/2010 | |
| WO | 2010146139 | A1 | 12/2010 | |
| WO | 2010146140 | A1 | 12/2010 | |
| WO | WO 2010146139 | A1 * | 12/2010 | ............ H04L 9/002 |
| WO | WO-2010146139 | A1 * | 12/2010 | ............ H04L 9/002 |
| WO | 2013/139380 | A1 | 9/2013 | |

OTHER PUBLICATIONS

Communication pursuant to Article 94(3) EPC issued in European Patent application No. 12712090.5 dated Aug. 4, 2017, 6 pages.
First Office Action received for Chinese Patent Application Serial No. 201280073305.4 dated Nov. 4, 2016, 17 pages (including English Translation).
Second Office Action received for Chinese Patent Application Serial No. 201280073305.4 dated Jul. 27, 2017, 10 pages (including English Translation).
Notification to Grant Patent Right for Invention received for Chinese Patent Application Serial No. 201280073305.4 dated Dec. 5, 2017, 3 pages (including English Translation).
Communication pursuant to Rules 161(1) and 162 EPC in European Application Serial No. 12712090.5 dated Nov. 6, 2014, 2 Pages.
Communication pursuant to Article 94(3) EPC issued in European Patent application No. 12712090.5 dated Jun. 20, 2018, 5 Pages.
International Preliminary Report on Patentability issued in corresponding International Application No. PCT/EP2012/054923 dated Oct. 2, 2014, 8 pages.
International Search Report and Written Opinion cited in corresponding International Application No. PCT/EP2012/054923 dated Dec. 11, 2012.
Plasmans M: "White-Box Cryptography for Digital Contents Protection", Master's Thesis, Technische Universiteit Eindhoven, Department of Mathematics and Computer Science, Eindhoven, May 1, 2005.
Olivier Billet et al: "Efficient Traitor Tracing from Collusion Secure Codes", Information Theoretic Security; Springer Berlin Heidelberg, Berlin, Sep. 10, 2008.
Olivier Billet et al: "Cryptanalysis of a White Box AES Implementation", H. Handschuh and A. Hasan, Springer Verlag Berlin Heidelberg 2005.
S. Chow et al: "White-Box Cryptography and an AES Implementation", 9th Annual Workshop on Selected Areas in Cryptography (SAC '02), Aug. 15-16, 2002.
Federal Information Processing Standards Publication 197 (FIPS PUB 197), "Advanced Encryption Standard (AES)", Nov. 26, 2001.
William C. Barker et al: "Recommendation for the Triple Data Encryption Algorithm (TDEA) Block Cipher", National Institute of Standards and Technology, Technology Administration, U.S. Department of Commerce, Jan. 2012.
Michiels et al: "Cryptanalysis of a Generic Class of White-Box Implementations", Selected Areas in Cryptography (SAC), Lecture Notes in Computer Science, vol. 5381, pp. 414-428, 2009.
Biryukov et al: "A Toolbox for Cryptanalysis: Linear and Affine Equivalence Algorithms", Advances in Cryptology, Eurocrypt 2003, Lecture Notes in Computer Science, vol. 2656, pp. 30-50, 2003.

\* cited by examiner

UPDATING KEY INFORMATION

RELATED APPLICATION DATA

This application is the National Stage of International Patent Application No. PCT/EP2012/054923, filed Mar. 20, 2012, the disclosure of which is hereby incorporated by reference in its entirety.

FIELD OF THE INVENTION

This invention relates to a method of providing key information from a sender to one or more receivers. The invention also relates to a method for a receiver to perform a cryptographic operation based on initial key information. The invention also relates to corresponding apparatus and computer programs.

BACKGROUND OF THE INVENTION

The Advanced Encryption Standard (AES) is a very well-known encryption algorithm. AES is a block cipher with a block size of 128 bits and a key size of either 128 bits, 192 bits or 256 bits. These three variants are denoted by AES-128, AES-192 and AES-256, respectively. Full details of AES can be found in "*Specification for the Advanced Encryption Standard (AES)*", National Institute of Standards and Technology (NIST), Federal Information Processing Standards Publication 197, 2001. Other block ciphers are, of course, also well-known, such as the Data Encryption Standard (DES), Triple-DES (referred to as the Triple Data Encryption Algorithm (TDEA) in the NIST Special Publication 800-67), Blowfish, Camellia, Serpent, etc.

AES is an iterated block cipher. FIG. 1a of the accompanying drawings illustrates the concept of an iterated block cipher. In particular, a round function H is defined. The iterated block cipher involves executing the round function H a number of times, i.e. as a number of iterations, each iteration being referred to as a "round". In FIG. 1a, there are n rounds. AES-128 has 10 rounds, AES-192 has 12 rounds and AES-256 has 14 rounds. Each round has an associated round key—in FIG. 1a, the round key associated with the i-th round is $RK_i$ (i=1, 2, . . . , n). In AES (that is, in AES-128, AES-192 and AES-256), the size of a round key is 128 bits. The inputs to the round function H for the i-th round (i=1, 2, . . . , n) are the round key $RK_i$ associated with that round and an amount of data $X_{(i-1)}$ to be operated on: for i=1 (i.e. for the first round), the data to be operated on, $X_0$, is the input plaintext or an initial amount of data (in case of AES, for i=1, the data to be operated on is a function of the input plaintext $X_0$ and an "initial round key" $RK_0$, as detailed later); for i>1 (i.e. for subsequent rounds), the data to be operated on, $X_{(i-1)}$, is the output of the preceding (i−1)-th round. For i=1, 2, . . . , n, the output of the i-th round is $X_i=H(X_{i-1},RK_i)$, i.e. the result of the round function H operating on the input data $X_{i-1}$ based on the round key $RK_i$: the output $X_n$ of the n-th round (i.e. the final round) is the ciphertext; for i<n, the output of the i-th round, $X_i$, forms the input to the next (i+1)-th round. The round function is normally the same for all rounds. However, it is possible that the round function may be different for some rounds than for other rounds—for example, in AES, the round function for the final round is a modified version of the round function for the other preceding rounds (insofar as it omits a certain processing step, as detailed later). For an iterated block cipher (e.g. AES), the round keys $RK_i$ are typically derived from the cipher's (initial) key using a key scheduling algorithm. Again, other iterated block ciphers are, of course, also well-known, such as DES, Triple-DES, Blowfish, Camellia, Serpent, etc.

Some iterated block ciphers (such as AES, Serpent, 3-Way, SAFER, SHARK and Square) involve a so-called "substitution-permutation (SP) network" (or "substitution-linear-transformation network"). In an SP network, the round function H can usually be divided into a round key addition layer, a substitution layer and a permutation or linear transformation layer. An example round function of an SP network is illustrated in FIG. 1b. The input to the round function is a block of data X and a round key RK. The key addition layer combines the input data X with the round key RK (e.g. as a bit-wise addition of X and RK modulo 2, i.e. as an XOR, denoted by ⊕ in FIG. 1b). The substitution layer makes use of one or more substitution boxes (or S-boxes) which each take a respective part of the output of the key additional layer and replace that part with a different value based on a invertible (or one-to-one) mapping defined by that S-box. In FIG. 1b, t S-boxes $S_1, . . . , S_t$ are illustrated they may be the same as each other or they may be different from each other. The permutation layer then takes the outputs of the S-boxes and permutes this total output from the substitution layer (e.g. as a permutation of the bits of the total output). However, it is possible that the round function H of an SP network performs the key addition layer, the substitution layer and the permutation layer in a different order. For example, the AES round function first applies a substitution layer (referred to as the "SubBytes" operation in AES). Next, a permutation layer (comprising the AES "ShiftRows" operation and the AES "MixColumns" operation) is applied to the output of the AES substitution layer. Finally, a key addition layer (referred to as the "AddRoundKey" operation in AES) is applied to the output of the AES permutation layer.

As mentioned before, it is possible that the round function of an SP network may be different for some rounds than for other rounds—for example, the final round of AES does not include the MixColumns operation. In an SP network, it is also possible that an operation is performed on the input plaintext before the first round is performed. For example, AES uses an additional key addition layer before the first AES round is applied. More precisely, an additional AES round key $RK_0$ is defined ($RK_0$ is referred to as the "initial round key" in AES). Like the round keys associated with the AES rounds, $RK_0$ is derived from the AES key using the AES key scheduling algorithm. The input for the first AES round is the XOR of the plaintext $X_0$, and the initial round key $RK_0$. Moreover, in an SP network it is also possible that an operation is performed on the output of the final round. The output of this operation is then the ciphertext. In AES this is not the case; in other words, the output of the final AES round is the ciphertext.

In an SP network as described above, either a round key addition layer is followed by a substitution layer or a substitution layer is followed by a round key addition layer. For example, in AES a round key addition layer is followed by the substitution layer of the next AES round. In the examples described in this document that involve a key addition layer and a substitution layer (or a part of these layers), it is assumed without loss of generality that a round key addition layer is followed by a substitution layer. However, if required, the techniques described in those examples can also be used in case a substitution layer is followed by a key addition layer, by making suitable adjustments to the described examples where necessary in ways which will be familiar to the skilled person. For example, such adjustments are required to apply the techniques to the final AES key addition layer.

A key addition layer and the substitution layer performed directly after the key addition layer may be viewed as comprising a number of parallel operations (which may be identical if a single S-box is used for the substitution layer). This operation is depicted in FIG. 1c of the accompanying drawings (note that, in FIG. 1c, the permutation layer of the round function is not illustrated). The inputs to the operation are a part, x, of the initial input data X to be processed (e.g. an intermediate result of the cipher, such as part of a result from another round) and a corresponding part, k, of the round key RK. In the operation, a bit-wise addition of x and k modulo 2 is performed (i.e. an XOR denoted by $\oplus$ in FIG. 1c). Next, the result of this addition is input to an S-box, denoted by S in FIG. 1c. The output of the operation is denoted by $S(k \oplus x)$, as shown in FIG. 1c. AES uses one fixed S-box mapping an 8 bit input to an 8 bit output. In AES, the size of the data block is 128 bits (i.e. 16 bytes), and x and k are each one byte—hence, the key addition layer and the substitution layer of an AES round may be viewed as comprising 16 identical parallel operations of the type shown in FIG. 1c. The round function for other iterated block ciphers that are SP networks may involve different numbers of operations of the type shown in FIG. 1c and, depending on whether or not they use the same S-box, they may or may not be identical to each other.

A white-box environment is an environment in which an adversary has complete access to the implementation of an algorithm and its execution environment. For example, the adversary may be able to: (1) trace program instructions of the implementation, (2) view the contents of memory and cache, including secret data, (3) stop execution at any point and run an off-line process, and (4) alter code or memory contents at will. To this end, the adversary may be able to make use of existing tools such as debuggers, decompilers, emulators, etc.

White-box cryptography aims at protecting a cryptographic key in a white-box environment, i.e. so that even if an adversary has complete access to the implementation of a cryptographic algorithm (such as source-code, which may be obfuscated, or executable files) and the environment in which that implementation is to be run (e.g. the adversary can execute the implementation in a debug mode to access values of data being stored in memory or to determine the sequence of operations performed), the adversary should not be able to deduce the cryptographic key that is being used (or the round keys that are being used in case of an iterated block cipher). A white-box implementation of AES is described in "*White-Box Cryptography and an AES Implementation*", Chow et al., Selected Areas in Cryptography, Lecture Notes in Computer Science, Volume 2595, pp. 250-270, 2003, referred to herein as CHOW.

A cryptanalysis of the white-box AES implementation in CHOW is presented in "*Cryptanalysis of a White Box AES implementation*", Billet et al., Selected Areas in Cryptography, Lecture Notes in Computer Science, Volume 3357, pp. 227-240, 2005, referred to herein as BILLET. In "*Cryptanalysis of a Generic Class of White-Box Implementations*", Michiels et al, Selected Areas in Cryptography (SAC), Lecture Notes in Computer Science, Volume 5381, pp. 414-428, 2009, referred to herein as MICHIELS, the cryptanalysis of the white-box AES implementation presented in BILLET is generalized for a generic class of SP networks (AES-128, AES-192 and AES-256 belong to this generic class of SP networks).

The white-box implementation in CHOW involves encoding intermediate results of the processing (e.g. the output of a round) using white-box encodings. A white-box encoding is a secret encoding, and the objective of using white-box encodings is to prevent an adversary from deducing the cryptographic key from the white-box implementation (e.g. by deducing the cryptographic key from intermediate results of the processing). The attacks in BILLET and MICHIELS exploit the fact that the intermediate results of the white-box implementation in CHOW are encoded using fixed white-box encodings—in other words, the white-box encoding used to encode an intermediate result is identical for different executions of the white-box implementation of the algorithm. A countermeasure against the attacks in BILLET and MICHIELS is disclosed in WO2010102960. This countermeasure uses so-called "self-equivalences" of the AES S-box. A self-equivalence is defined as a pair of invertible affine mappings (G, g) from R to R (where R is the range of possible inputs and outputs of the S-box under consideration which, is usually $Z_2^n$ for some integer n and, in the case of AES, is $Z_2^8$, i.e. n=8 in the case of AES) with the property that $g \circ S \circ G^{-1} = S$; in other words, with the property that $S(y)=g(S(G^{-1}(y)))$ for all $y \in R$. In the rest of the document, we shall refer to $R=Z_2^n$, but it will be appreciated that R may be a more general range of values. In particular, this implies that the output of S equals $g(S(y))$ if the input equals $G(y)$, as depicted in FIG. 2 of the accompanying drawings. In "*A Toolbox for Cryptanalysis: Linear and Affine Equivalence Algorithms*", Biryukov et al., Advances in Cryptology, Eurocrypt 2003, Lecture Notes in Computer Science, Volume 2656, pp. 33-50, 2003, referred to herein as BIRYUKOV, it was shown that the number of self-equivalences for the AES S-box equals 2040.

As described briefly below, self-equivalences of an S-box can be used as a security measure in a white-box implementation more detailed information on this can be found in WO2010102960. In the description below, it is assumed without loss of generality that all white-box encodings are invertible affine mappings. Additional non-linear white-box encodings can be added to the implementation after the techniques described below have been applied, in ways which will be familiar to the skilled person. Further, it is assumed that white-box encodings $\alpha$ and $\beta$ are used to encode the input and the output of an S-box, respectively. In the white-box implementation, the mappings $\alpha$ and $\beta$ are composed with the S-box mapping to protect their confidentiality, and the result is denoted by T (also referred to as a T-box), as shown in FIG. 3 of the accompanying drawings. Note that $T = \beta \circ S \circ \alpha^{-1}$. Typically, T is implemented as a look-up table in the white-box implementation—in the case of AES where the inputs and the outputs of the S-box (and hence the T-box) are one byte, the S-box and hence the T-box consist of $2^8 = 256$ entries, the size of each entry being one byte. In the white-box implementation, every instance of an S-box may use unique encodings $\alpha$ and $\beta$ (and consequently, may be implemented using a unique look-up table) for example, whilst AES uses the same S-box for all of the operations (of the type shown in FIG. 1c), each of these operations could make use of their own respective $\alpha$ and $\beta$ to result in different T-boxes being used. Alternatively, several instances of the S-box may use the same encodings $\alpha$ and $\beta$, which may reduce the implementation size of the white-box implementation (through re-use of a look-up table).

The self-equivalences of the T-box are related to the self-equivalences of the corresponding S-box. More precisely, if the sets of self-equivalences of the S-box and the T-box are denoted by $EQ(S)=\{(G_\lambda,g_\lambda)|g_\lambda°S°G_\lambda^{-1}=S$ and $(G_\lambda,g_\lambda)$ is a pair of invertible affine mappings from $Z_2^n$ to $Z_2^n\}$ and $EQ(T)=\{(E_\varphi,e_\varphi)|e_\varphi°T°E_\varphi^{-1}=T$ and $(E_\varphi,e_\varphi)$ is a pair of invertible affine mappings from $Z_2^n$ to $Z_2^n\}$ respectively, then for every $\lambda$, there exists a unique $\varphi$ such that $E_\varphi=\alpha°G_\lambda°\alpha^{-1}$ and $e_\varphi=\beta°g_\lambda°\beta^{-1}$ and for every $\varphi$, there exists a unique $\lambda$ such that $G_\lambda=\alpha^{-1}°E_\varphi°\alpha$ and $g_\lambda=\beta^{-1}°e_\varphi°\beta$. In particular, the size of the set EQ(T) is equal to the size of the set EQ(S) (which, for AES, is 2040).

As described in WO2010102960, the self-equivalences of a T-box can be used to apply a "variable encoding" to the input and the output of a T-box, in that the encoding can vary in different executions of the white-box implementation. To see how this can be done, observe that $\beta(S(y))$ is the output of the T-box if $\alpha(y)$ is the input to the T-box. It follows that if $E_\varphi(\alpha(y))$ with $(E_\varphi,e_\varphi)\in EQ(T)$ is input to the T-box, then the output of the T-box equals $e_\varphi(\beta(S(y)))$ (as shown in FIG. 3). In this way a variable encoding can be applied to the input and the output of a T-box, using only one instance of the T-box in the implementation, with the variable encoding being indexed by $\varphi$. For instance, in the white-box implementation the value of $\varphi$ can be made dependent on several non-encoded intermediate values of the encryption (or decryption) operation, as detailed in WO2010102960.

An intermediate result of the encryption (or decryption) operation that is neither an input to nor an output of an S-box may use a variable encoding that is not associated with a self-equivalence of a T-box. For example, a specific byte of such an intermediate result may be associated with a set $\{\tau_\delta|\tau_\delta$ is an invertible affine mapping from $Z_2^8$ to $Z_2^8\}$ consisting of white-box encodings. The encodings $\tau_\delta$ may be secret encodings. This set is selected when the white-box implementation is generated. In every execution of the white-box implementation, one of the encodings in this set is applied to the intermediate result. The value of $\delta$ (used to select a particular encoding from the set) can also be made dependent on several non-encoded intermediate values of the encryption (or decryption) operation. Re-encodings can be applied to transform a variable encoding from one set to a variable encoding from a different set (for example, such a re-encoding can be implemented as one or more look-up tables in the white-box implementation). As a result, an intermediate value of the white-box implementation that is neither an input to nor an output of an S-box can also be encoded using variable white-box encodings in that the encoding can vary in different executions of the white-box implementation. In other words, even if a non-encoded intermediate value y (e.g., y being a non-encoded input to the T-box) is the same in different executions of the white-box implementation (for example, when encrypting different plaintexts using the same key), the encoded value of y (for example, $E_\varphi(\alpha(y))$ being the encoded input to the T-box) may differ. As detailed in WO2010102960, this property prevents the attacks presented in BILLET and MICHIELS.

In the white-box implementation, the indices of the variable encodings have to be maintained/stored. In particular, an index is required as input to a re-encoding (transforming a variable encoding from one set to a variable encoding from a different set) and at some point in the implementation the variable encodings applied to the intermediate results of the encryption (or decryption) operation have to be removed, i.e. all white-box encodings need to be removed to compute the output ciphertext (or output plaintext in case of decryption).

Many applications in which white-box cryptography is deployed require that it is possible to provide an updated cryptographic key (such as an AES key) to the white-box implementation. One possibility to update the cryptographic key is to update all look-up tables in the white-box implementation that are dependent on the cryptographic key. This is described, for example, in WO2008142612. Alternatively, all look-up tables of a white-box implementation can be updated to update the cryptographic key. However, in certain applications the key update needs to be distributed using a limited amount of bandwidth. A pay-TV conditional access system is an example of such an application. For such applications, schemes are required that implement a smaller key update size than set out above.

Schemes for white-box implementations with a small key update size are described in WO2010146140 and WO2010146139. In these schemes, the cryptographic key (such as an AES key) is first expanded; that is, first the round keys are computed from the initial cryptographic key using the key scheduling algorithm associated with the cryptographic algorithm (the set of round keys associated with a cryptographic key is also referred to as an expanded key in the following). Next, the round keys are encoded using white-box encodings. Finally, the encoded round keys are distributed, after which they can be used as an input to the white-box implementation of the cryptographic algorithm. In the schemes presented in WO2010146140 and WO2010146139, the size of each encoded round key is the same as the size of a non-encoded round key. Hence, the size of the key update information (comprising the set of encoded round keys) is equal to the size of the expanded key (i.e. the total size of the set of non-encoded round keys). AES-128 has 11 round keys (comprising one round key associated with each of the 10 AES rounds and an initial round key) and each round key consists of 16 bytes—this means that in these update schemes 11×16=176 encoded round key bytes need to be distributed to update an AES-128 key. For AES-192, the number of round key bytes equals 13×16=208 and for AES-256, this number equals 15×16=240. This is a significantly smaller amount of data than having to distribute update look-up tables for the white-box implementation.

SUMMARY OF THE INVENTION

The inventors have recognised that there is a disadvantage of the key update methods presented in WO2010146140 and WO2010146139, in that each round key byte of the expanded key is encoded using a fixed white-box encoding, i.e. the encoding (mapping or function) used to encode each byte is the same encoding for all bytes of the round keys that are to be distributed, and this encoding (or mapping or function) remains the same for all key updates (i.e. from one key update to the next). As there are only 256 different values that a round key byte can assume, and as a key update could involve, say, 176 bytes (if AES-128 is being used), the probability that one or more specific round key bytes are equal in two expanded AES keys is high. If fixed encodings are used to encode the round key bytes, then two identical round key bytes (e.g. in two expanded AES keys) (which will occur with high probability) will be encoded to form identical encoded round key bytes. This property may be exploited by an adversary. For example, assume that an adversary compromises a first AES-128 key, and that a second AES-128 key is distributed as a key update to correct the security breach. For each specific round key byte, the adversary can compare the value of the encoded round key byte associated with the compromised first AES-128 key with the value of the encoded round key byte associated with the updated second AES-128 key. If the values of such encoded round key bytes are equal, then the entropy of the updated second AES-128 key is reduced. For example, assume that the values of two specific bytes of a round key associated with the compromised first AES-128 key are identical to the values of these two round key bytes associated with the updated second AES-128 key. By comparing the values of the encoded round key bytes associated with these two AES-128 keys for each specific round key byte, the adversary can determine which of the encoded round key bytes are equal. Next, using the compromised first AES-128 key and the AES key scheduling algorithm, the adversary can compute the values of the two round key bytes of the compromised first AES-128 key. As fixed white-box encodings were used, these two values are equal to the values of the two round key bytes of the updated second AES-128 key. Consequently, the adversary now only needs to try to obtain the values of the remaining 14 bytes of that round key associated with the updated second AES-128 key. After the adversary obtains the values of these remaining 14 bytes, the adversary can use the AES key scheduling algorithm to compute the second AES-128 key (since knowledge of one AES-128 round key is sufficient to compute the AES-128 key; this is a property of the AES key scheduling algorithm). This means that in this example, the entropy of the updated second AES-128 key is reduced from 16 bytes to 14 bytes. Notice that this security drawback increases further if multiple round key bytes of an expanded AES key are encoded using the same fixed white-box encoding.

The inventors have, therefore, recognised that it would be desirable to improve security to address this issue.

An object of the invention is to be able to provide a key update for a white-box implementation in which the key update size is small (that is, the size of a key update is of the same order of magnitude as would be achieved if using the schemes presented in WO2010146140 and WO2010146139).

An object of the invention is to help improve security. As will be described, one way in which this is achieved is that, in embodiments of the invention, round key bytes can be encoded in more than one way. As will also be described, in some embodiments of the invention, security may be improved in that an adversary cannot use the white-box implementation of the round key addition layer to verify if round key bytes associated with differently encoded round key bytes are equal.

According to a first aspect of the invention, there is provided a method of providing key information from a sender to one or more receivers, the method comprising: obtaining initial key information comprising a plurality of units that assume respective values; forming encoded key information from the initial key information, wherein the encoded key information comprises a plurality of encoded units that correspond to respective units of the initial key information, wherein said forming comprises, for each unit of the initial key information, selecting an encoding from a plurality of invertible encodings associated with said unit and encoding said value assumed by said unit with said selected encoding to form the corresponding encoded unit; and providing the encoded key information to said one or more receivers.

In some embodiments, one or more of the invertible encoding is a secret shared between the sender and said one or more receivers.

In some embodiments, the initial key information comprises one or more cryptographic keys. For example, each receiver may be arranged to perform a symmetric cryptographic algorithm, said symmetric cryptographic algorithm comprising a plurality of rounds, and each of said one or more cryptographic keys may be a round key for a corresponding round of said symmetric cryptographic algorithm. The method may comprise obtaining said one or more round keys from an initial key.

In some embodiments, for at least a first unit and a second unit of the initial key information the plurality of encodings associated said first unit is different from the plurality of encodings associated with said second unit.

In some embodiments, the method comprises identifying the selected encodings to each receiver.

According to an aspect of the invention, there is provided a method for a receiver to perform a cryptographic operation based on initial key information, the method comprising: receiving encoded key information comprising a plurality of encoded units that assume respective values, said encoded key information corresponding to said initial key information, wherein the value assumed by each encoded unit is the value of a corresponding unit of the initial key information encoded with an encoding selected from a plurality of invertible encodings associated with said corresponding unit of the initial key information; and performing a white-box function as part of said cryptographic operation, said white-box function being arranged to: receive an input comprising (a) an encoded unit and (b) an identification of the selected encoding for that unit; and produce a first output dependent on the value of the corresponding unit of the initial key information.

In some embodiments, said input additionally comprises (c) a quantity of data encoded according to a selected one of a plurality of invertible data-encodings and (d) an identification of the selected data-encoding used to encode said quantity of data, and said first output is additionally dependent on the quantity of data. Said first output may be encoded according to one of a plurality of output-encodings, wherein the output-encoding used by said white-box function is dependent on the encoding selected for said unit and/or the data-encoding used to encode said quantity of data, said white-box function also being arranged to output, along with said first output, an identification of the output-encoding used. The output-encoding used by said white-box function may be dependent on the encoded unit and/or the encoded quantity of data. The output-encoding used by said white-box function may be different for each of the plurality of invertible encodings. In some embodiments, the method comprises encoding the identification of the output-encoding using one of a plurality of identification-encodings, wherein the identification-encoding used is dependent on at least part of the input.

In some embodiments, the white-box function is implemented as one or more look-up tables.

According to an aspect of the invention, there is provided an apparatus comprising a processor, said processor being configured to carry out any one of the above-described methods.

According to an aspect of the invention, there is provided a computer program which, when executed by a processor, causes the processor to carry out any one of the above-described methods.

According to an aspect of the invention, there is provided a computer-readable medium storing such a computer program.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 4:
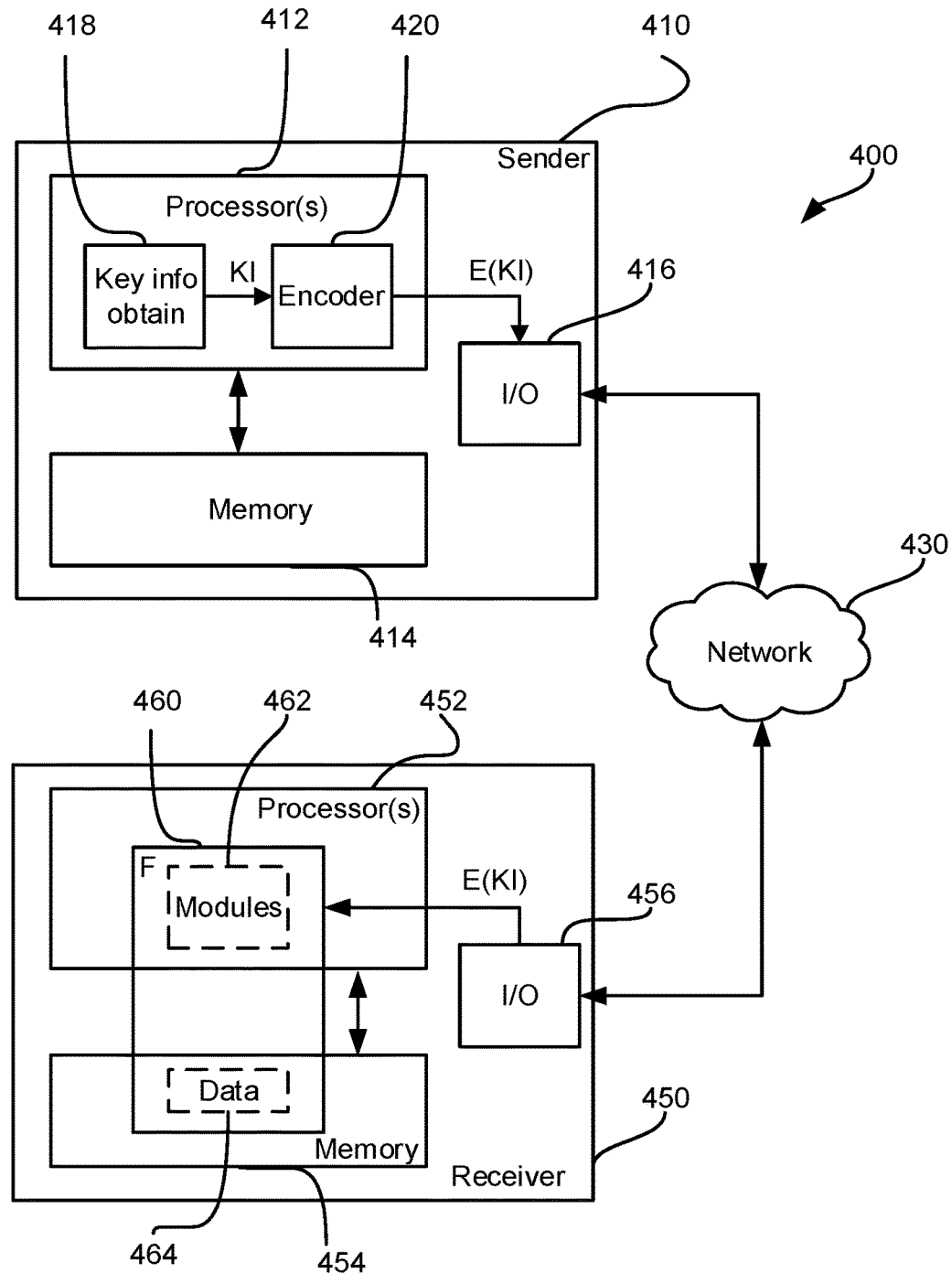
FIG. 4 schematically illustrates a system according to an embodiment of the invention.

FIG. 4 schematically illustrates a system 400 according to an embodiment of the invention. The system 400 comprises a sender 410 that is arranged to communicate with a receiver 450 via a communications network 430. Whilst FIG. 4 depicts a system 400 with a single sender 410 and a single receiver 450, this is purely for clarity and ease of explanation, and it will be appreciated that the system 400 could comprise a plurality of senders 410 and/or a plurality of receivers 450, with each sender 410 being arranged to communicate with one or more of the receivers 450 and each receiver 450 being arranged to communicate with one or more of the senders 410.

The network 430 may be any kind of network suitable for transmitting or communicating data from the sender 410 to the receiver 450. For example, the network could comprise one or more of a local area network, a wide area network, a metropolitan area network, the internet, a wireless communications network, a cable network, a digital broadcast network, a satellite communication network, a telephone network, etc. The sender 410 may then communicate with the receiver 450 over the network 430 via any suitable communication mechanism/protocol in order to communicate data from the sender 410 to the receiver 450.

The sender 410 may be any system that is suitable for communicating data to the receiver 450 via the network 430. The sender 410 comprises one or more processors 412, a memory 414 and a network interface 416. The network interface 416 is arranged to interface with the network 430 to enable the sender 410 to communicate with the network 430 (so that the sender 410 can then communicate with the receiver 450 via the network 430). As examples, the sender 410 could be a headend system of a digital broadcast system or of a cable network system, or the sender 410 may comprise one or more servers for transmitting, or providing access to, data over the internet, but it will be appreciated that the sender 410 may take other forms instead.

Similarly, the receiver 450 may be any system that is suitable for receiving data from the sender 410 over the network 430. The receiver 450 comprises one or more processors 452, a memory 454 and a network interface 456. The network interface 456 is arranged to interface with the network 430 to enable the receiver 450 to communicate with the network 430 (so that the receiver 450 can then communicate with the sender 410 via the network 430). As examples, the receiver 450 may comprise one or more of a set-top-box, a smartcard, a personal computer, a mobile telephone, a games console, etc., but it will be appreciated that the receiver 450 may take other forms instead.

The receiver 450 has a white-box implementation 460 of one or more operations (or functions or procedures) F, which could be, for example, cryptographic operations. The white-box implementation 460 may comprise one or more software modules 462 executable by the processor 452 and/or various data (such as one or more look-up tables) 464 stored in the memory 454 which the processor 452 reads and uses to carry out the operation F. The operation F makes use of key information KI to generate an output of the operation F, i.e. the output of the operation F is based, at least in part, on the key information KI. For example, the operation F could be an encryption operation for encrypting data based on specific keys (specified by or derived from the key information KI) or a decryption operation for decrypting data based on specific keys (specified by or derived from the key information KI). The operation F may be an operation (or function or module or stage) that forms part of a larger cryptographic operation or part of some other processing carried out by the processor 452. As the function F is implemented as a white-box implementation 460, an adversary should not be able to deduce or derive the key information KI from the white-box implementation 460 or from the processing performed by the processor 452 when executing the white-box implementation 460 to carry out the function F.

The receiver 450 receives the key information KI from the sender 410. As will be discussed in more detail below, the sender 410 provides the key information KI to the receiver 450 in an encoded form, i.e. as encoded key information E(KI). The white-box implementation 460 receives the encoded key information E(KI) and is arranged to process the received encoded key information E(KI) to generate an output that is dependent, at least in part, on the original/initial key information KI.

Turning to the sender 410, the sender 410 comprises a key information obtaining module 418 and an encoding module 420. These two modules may, for example, be implemented as software components or modules for execution by the processor 412.

In summary, the key information obtaining module 418 obtains the key information KI and provides the key information KI to the encoding module 420; the encoding module 420 encodes the key information KI to obtain the encoded key information E(KI)—the nature of this encoding shall be described in more detail shortly; the network interface 416 then communicates the encoded key information E(KI) over the network 430 to the receiver 450; at the receiver 450, the network interface 456 receives the communicated encoded key information E(KI) and passes it to the processor 452 (the processor 452 may store the encoded key information E(KI) in the memory 454 and/or pass the encoded key information E(KI) to the white-box implementation 460); the white-box implementation 460 may then perform the operation F using the encoded key information E(KI) to generate an output that is dependent, at least in part, on the original/initial key information KI.

The key information KI may be any information for configuring the white-box implementation 460 (i.e. for configuring or controlling the operation F). For example, the key information KI may comprise one or more cryptographic keys and/or information for enabling the white-box implementation 460 to derive or obtain one or more cryptographic keys. In some embodiments in which the cryptographic function F comprises a sequence of rounds and each round has an associated round key, the key information KI may comprise the round keys for the sequence of rounds (or information from which the plurality of round keys may be derived). For example, if the white-box implementation 460 is a white-box implementation of AES-128, then the key information KI may comprise the 11 round keys (i.e. an initial round key and one round key associated with each of the 10 AES-128 rounds) accordingly. In some embodiments, the key information KI may comprise part of a cryptographic key or part of a plurality of round keys (or information from which the part of the cryptographic key or the part of the plurality of round keys may be derived); the other part of the cryptographic key or the other part of the plurality of round keys may already be available to the white-box implementation 460.

The key information obtaining module 418 may obtain the key information KI in a number of ways. For example, the key information obtaining module 418 may be arranged to receive the key information KI from a third party (not shown in FIG. 4). The key information obtaining module 418 may be arranged to generate the key information KI. For example, the key information KI may comprise a symmetric key for a symmetric encryption algorithm, or if the cryptographic function F uses a plurality of round keys, then the symmetric key may comprise the plurality of round keys, and the key information obtaining module 418 may be arranged to randomly generate the symmetric key (randomly generating a set of "independent" round keys in case the symmetric key comprises a plurality of round keys). Similarly, if the cryptographic function F uses a plurality of round keys derived from a symmetric key using a key scheduling algorithm, then the key information KI may comprise the plurality of round keys corresponding to a sequence of rounds implemented by the white-box implementation 460, and the key information obtaining module 418 may use the key scheduling algorithm to generate the round keys from the symmetric key (which the key information obtaining module 418 may have generated itself, possibly randomly, or which the key information obtaining module 418 may have received from a third party, not shown in FIG. 4).

Figure 5:
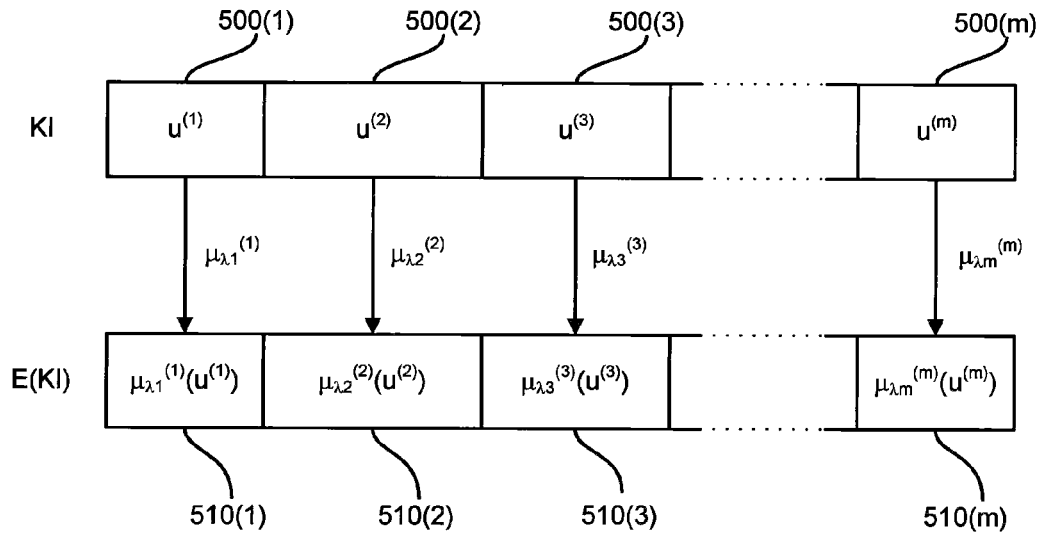
FIG. 5 schematically illustrates the relationship between key information and corresponding encoded key information.

FIG. 5 schematically illustrates the relationship between the key information KI and the encoded key information E(KI).

The key information KI comprises a plurality of units (or blocks of data or chunks of data or distinct quantities of data) that assume respective values. In FIG. 5, the key information KI is shown as comprising m units 500(1), 500(2), . . . , 500(m) that assume respective values $u^{(1)}, u^{(2)}, \ldots, u^{(m)}$. The units 500 may all be the same size—for example, they may all be the same number of bits or the same number of bytes of the key information KI. In particular, the units 500 may all be one byte in size. However, it will be appreciated that some units 500 may have a different size from other units 500.

If the key information KI comprises a plurality of cryptographic keys (e.g. if the key information KI may comprise a plurality of round keys), then the units 500 of the key information KI may be arranged such that each key is formed from one or more respective units 500 (with the property that each unit 500 belongs to only one cryptographic key). Each unit 500 of the key information KI has a corresponding set of encodings (i.e. an associated plurality of encodings or functions or mappings). In particular, for each unit 500(i) (i=1, 2, . . . , m), there is corresponding set of encodings $U^{(i)} = \{\mu_\lambda^{(i)} | 1 \leq \lambda \leq n^{(i)}, \mu_\lambda^{(i)}$ is an invertible mapping from $KD^{(i)}$ to $KC_\lambda^{(i)}\}$, where $n^{(i)}$ is the number of encodings associated with the i-th unit 500(i), $KD^{(i)}$ is the domain of an encoding $\mu_\lambda^{(i)}$ (which is defined as the range of possible values that the key information in the i-th unit 500(i) can assume), and $KC_\lambda^{(i)}$ is the codomain of an encoding $\mu_\lambda^{(i)}$. Note that, in general, the codomains of the encodings $\mu_\lambda^{(i)}$ associated with a unit 500(i) may be different for different values of λ. However, as all encodings in the set $U^{(i)}$ are invertible, the number of elements in $KD^{(i)}$ is equal to the number of elements in $KC_\lambda^{(i)}$ for every value of λ ($1 \leq \lambda \leq n^{(i)}$). In some embodiments $KD^{(i)}$ is equal to $KC_\lambda^{(i)}$ for every value of $\lambda (1 \leq \lambda \leq n^{(i)})$. For example, if a unit 500(i) is one byte of the key information KI, then each of the $n^{(i)}$ encodings $\mu_\lambda^{(i)}$ in the associated set $U^{(i)}$ may be an invertible mapping from $Z_2^8$ to $Z_2^8$ (that is, $KD^{(i)} = KC_\lambda^{(i)} = Z_2^8$ in this example).

The encodings are preferably affine encodings.

The number of encodings associated with one unit 500(i) (i.e. the value of $n^{(i)}$) may the same as, or may be different from, the number of encodings associated with another unit 500(j) (i.e. the value of $n^{(j)}$). For any two units 500(i) and 500(j), the associated sets of encodings $U^{(i)}$ and $U^{(j)}$ may or may not overlap and could even be identical.

The encodings are preferably a secret held by the sender 410 and, to the extent that the white-box implementation 460 may be able to carry out the inverse of the encodings, held by the white-box implementation 460. The white-box implementation 460 preferably protects the confidentiality of the encodings, e.g. by composing each encoding with another secret function or mapping, and by only implementing this composition in the white-box implementation 460.

The encoded key information E(KI) also comprises a plurality of units (or blocks of data or chunks of data or distinct quantities of data) that assume respective values. The units of the encoded key information E(KI) shall be referred to as encoded units 510—in FIG. 5, the encoded key information E(KI) comprises m encoded units 510(1) . . . 510(m). Each encoded unit 510 of the encoded key information E(KI) corresponds to a respective unit 500 of the original/initial key information KI. In particular, for each unit 500(i) (i=1, 2, . . . , m) of the original/initial key information KI, there is a corresponding encoded unit 510(i) in the encoded key information E(KI) whose value is $\mu_{\lambda(i)}^{(i)}(u^{(i)})$ for some encoding $\mu_{\lambda(i)}^{(i)}$ in the set of encodings $U^{(i)}$ associated with unit 500(i), where $\lambda(i)$ in an index with $1 \leq \lambda(i) \leq n^{(i)}$, i.e. the value assumed by an encoded unit 510(i) is the value $u^{(i)}$ assumed by the corresponding unit 500(i) of the original/initial key information KI encoded with one of the encodings in the set of encodings associated with that corresponding unit 500(i) of the original/initial key information KI. Notice that the codomain $KC_{\lambda(i)}^{(i)}$ of the encoding $\mu_{(i)}^{(i)}$ defines the set of values that the encoded unit 510(i) can assume when the encoding $\mu_{(i)}^{(i)}$ is used. The value of $\lambda$ may be different for different units 500, i.e. $\lambda(i)$ for one unit 500(i) may be different from $\lambda(j)$ for a different unit 500(j).

Recall that the number of elements in $KD^{(i)}$ is equal to the number of elements in $KC_\lambda^{(i)}$ for every value of $\lambda$ ($1 \leq \lambda \leq n^{(i)}$); however, in general, the size of the representation of the values $u^{(i)}$ (assumed by a unit 500(i)) may differ from the size of the representation of the values $\mu_\lambda^{(i)}(u^{(i)})$ (assumed by the corresponding encoded unit 510(i), $1 \leq \lambda(i) \leq n^{(i)}$). In particular, the size of the unit 500(i) may differ from the size of the corresponding encoded unit 510(i).

The set of encodings $U^{(i)}$ for each unit 500(i) (i=1, 2, . . . , m) is available to the encoding module 420 of the sender 410. For example, the set of encodings $U^{(i)}$ may be part of a software module executed by the processor 412 and/or may be stored (for example as one or more look-up tables) within the memory 414 and accessible to the processor 412.

The encoding module 420 generates (or forms) the encoded key information E(KI) from the original/initial key information KI obtained by the key information obtaining module 418 by, for each unit 500(i) (i=1, 2, . . . , m) of the initial key information KI, selecting an encoding $\mu_{\lambda(i)}^{(i)}$ from the plurality of invertible encodings associated with that unit 500(i) and encoding the value $u^{(i)}$ assumed by that unit 500(i) with the selected encoding $\lambda_{\lambda(i)}^{(i)}$ to form the corresponding encoded unit 510(i) that then assumes the value $\mu_{\lambda(i)}^{(i)}(u^{(i)})$. The encoding module 420 may select the encodings to use in any suitable way—for example the selection of an encoding from the set $U^{(i)}$ may be a random selection (the encoding module 420 comprising a random number generator, seeded by a seed value, that the encoding module 420 uses to generate indices $\lambda(i)$ for i=1, 2, . . . , m, with $1 \leq \lambda(i) \leq n^{(i)}$); the encoding module 420 may repeatedly cycle through the set $U^{(i)}$ so that when an encoding is to be selected from the set $U^{(i)}$, the next encoding is selected; etc.

Once the encoded key information E(KI) has been generated, the sender 410 uses the network interface 416 to send the encoded key information E(KI) to the receiver 450 via the network 430.

The sender 410 may also send to the receiver 450 (via the network 430), along with the encoded key information E(KI), information identifying the encodings that were selected by the encoding module 420 (and thereby enabling the white-box implementation 460 at the receiver 450 to undo the encodings). This identification information could specify, for each unit 500(i) for i=1, 2, . . . , m, the particular encoding selected (for example, the identification information could comprise, for each unit 500(i), the index $\lambda(i)$ of the selected encoding $\mu_{\lambda(i)}^{(i)}$). Alternatively, if the selection carried out by the encoding module 420 is a random selection based on a seed value for a random number generator, then the identification information could comprise the seed value. However, it will be appreciated that the sender 410 may not need to provide such identification information to the receiver 450. For example, a third party (other than the sender 410) could provide the identification information to the receiver 450. Alternatively, the sender 410 and the receiver 450 may be synchronised. For example, the sender 410 and the receiver 450 may have been both initialised with the same seed value for respective random number generators—when the encoding module 420 encoded the units 500(i) of the initial key information KI to generate the encoded units 510(i) of the encoded key information E(KI), the random number generator at the sender 410 may be used to select the indices $\lambda(i)$ of the encodings to use for each unit 500(i); similarly, when the encoded key information E(KI) is received at the receiver 450, the random number generator at the receiver 450 (which will produce the same output as the random number generator at the sender 410 since they have been seeded with the same seed value) may be used to determine the indices $\lambda(i)$ of the encodings that the sender 410 used for each unit 500(i).

The use of the sets of encodings $U^{(i)}$ associated with respective units 500(i), and the selection of encodings therefrom as set out above, means that even if two units 500 of the key information KI assume the same value, then the corresponding encoded units 510 of the encoded key information E(KI) could assume different, unrelated, values. Similarly, if a unit 500(i) (with $1 \leq i \leq m$) of a first amount of key information $KI_1$ provided to the receiver 450 assumes the same value as the unit 500(i) of a second amount of key information $KI_2$ provided to the receiver 450, then the corresponding encoded units 510(i) of the encoded key information $E(KI_1)$ and $E(KI_2)$ could assume different, unrelated, values. Thus, if an adversary were able to determine the value of a unit 500(i) of a first amount of key information, then the adversary cannot deduce the value of the unit 500(i) of a second amount of key information from the corresponding encoded units 510(i)—even if the encoded units 510(i) are equal, then that does not imply any relationship between the values of the corresponding units 500(i). Similarly, the use of the sets of encodings $U^{(i)}$ and $U^{(j)}$ (with $1 \leq i \leq m$, $1 \leq j \leq m$ and $i \neq j$) associated with respective units 500(i) and 500(j) means that if two units 500(i) and 500(j) of the key information KI assume the same value, then the corresponding encoded units 510(i) and 510(j) of the encoded key information E(KI) could assume different, unrelated, values, even in case the set $U^{(i)}$ is equal to the set $U^{(j)}$.

Figure 6A:
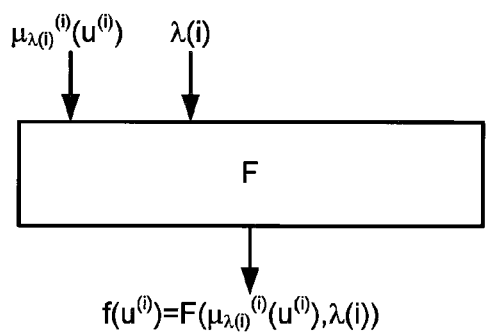
FIG. 6a schematically illustrates the processing performed by a function F as implemented by a white-box implementation according to an embodiment of the invention.

FIG. 6a schematically illustrates the processing performed by the function F as implemented by the white-box implementation 460 according to an embodiment of the invention (in this embodiment, the function F may depend on the index i of the unit 500 and the corresponding encoded unit 510). In particular, the function F receives an input comprising (a) an encoded unit 510 (with a value $\mu_{\lambda(i)}^{(i)}(u^{(i)})$) of the encoded key information E(KI) and (b) an identification of the selected encoding $\mu_{\lambda(i)}^{(i)}$ for that unit 510—in this embodiment, the identification is the index $\lambda(i)$ of the selected encoding $\mu_{\lambda(i)}^{(i)}$ in the set of encodings $U^{(i)}$ associated with the unit 500. The function F produces an output that is dependent on the value $u^{(i)}$ of the corresponding unit 500 of the initial key information KI (this output is denoted by $f(u^{(i)})$ in FIG. 6a; that is, $F(\mu_{\lambda(i)}^{(i)}(u^{(i)}), \lambda(i)) = f(u^{(i)})$), with this being carried out by the white-box implementation 460. This could be achieved, for example, by the white-box implementation 460 implementing the function F as one or more look-up tables (indexed by the value $\mu_{\lambda(i)}^{(i)}$ ($u^{(i)}$) and the value $\lambda(i)$), with the look-up table(s) essentially undoing (or removing or applying the inverse of) the encoding $\mu_{\lambda(i)}^{(i)}$ and operating on the value $u^{(i)}$. In this embodiment the function f may be a non-secret function, or the function f may be a secret function (e.g. f may be the composition of a non-secret function and a white-box encoding). It will be appreciated, of course, that the function F in FIG. 6a may receive an input comprising (a) a plurality of encoded units 510 of the encoded key information E(KI) and (b) an identification of the selected encodings for those units 510, with the function F then producing an output that is dependent on the values of the corresponding units 500 of the initial key information KI. However, for ease of illustration, only one encoded unit 510 is shown in FIG. 6a.

Figure 6B:
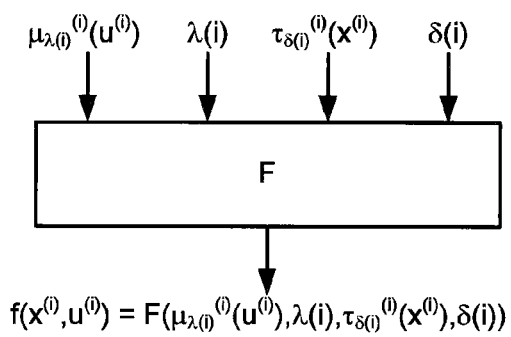
FIG. 6b schematically illustrates the processing performed by a function F as implemented by a white-box implementation according to an embodiment of the invention.

FIG. 6b schematically illustrates the processing performed by the function F as implemented by the white-box implementation 460 according to another embodiment of the invention (as above, the function F may depend on the index i of the unit 500 and the corresponding encoded unit 510). FIG. 6b is the same as FIG. 6a (and hence the above description applies analogously), except that the input to the function F also comprises (c) a quantity of data, $x^{(i)}$, encoded according to a selected one, $\tau_{\delta(i)}^{(i)}$, of a plurality of invertible data-encodings (so that the encoded quantity of data is $\tau_{\delta(i)}^{(i)}(x^{(i)})$), and (d) an identification of the selected data-encoding used to encode said quantity of data—in the embodiment shown in FIG. 6b, this identification is the index $\delta(i)$. The output of the function F is dependent on the quantity of data $x^{(i)}$ (in addition to being dependent on the value $u^{(i)}$ of the unit 500 of key information KI). For example, as mentioned above, intermediate results of the processing performed by the white-box implementation 460 may be encoded with an encoding $\tau_{\delta(i)}^{(i)}$ chosen from a set of encodings $T^{(i)}:=\{\tau_{\delta(i)}^{(i)}|1\leq\delta(i)\leq r^{(i)}, \tau_{\delta(i)}^{(i)}$ is an invertible mapping from $DD^{(i)}$ to $DC^{\delta(i)}\}$, where $r^{(i)}$ is the number of encodings associated with the intermediate value $x^{(i)}$, $DD^{(i)}$ is the domain of an encoding $\tau_{\delta(i)}^{(i)}$ (which is defined as the range of possible values that the intermediate value can assume), and $DC^{\delta(i)}$ is the codomain of an encoding $\tau_{\delta(i)}^{(i)}$ (with respect to the domain and codomains of an encoding in $T^{(i)}$, similar reasoning applies as described above for the domains and codomains of the encodings in a set $U^{(i)}$). The intermediate value $x^{(i)}$, may, for example, be part (e.g. a byte) of the output of a round function H of a preceding round of an iterated block cipher (e.g. part of the input of a key addition layer), with that intermediate value, $x^{(i)}$, being encoded by one of the encodings in $T^{(i)}$, so that the input to the function F additionally comprises the encoded intermediate value $\tau_{\delta(i)}^{(i)}(X)$ and an indication of the particular encoding $\tau_{\delta(i)}^{(i)}$ (such as an index $\delta(i)$). The input to the function F may therefore include an encoded intermediate value of the cipher's encrypt or decrypt operation. The function F could, for instance, be implemented within the white-box implementation 460 as one or more look-up tables (indexed by the value $\mu_{\lambda(i)}^{(i)}$ ($u^{(i)}$), the value $\lambda(i)$, the value $\tau_{\delta(i)}^{(i)}(x)$ and the value $\delta(i)$), with the look-up table(s) essentially undoing (or removing or applying the inverse of) the encodings $\mu_{\lambda(i)}^{(i)}$ and $\tau_{\delta(i)}^{(i)}$ and operating on the values $u^{(i)}$ and $x^{(i)}$. The output of F is denoted by $f(x^{(i)},u^{(i)})$ in FIG. 6b; that is, $F(\mu_{\lambda(i)}^{(i)}(u^{(i)}), \lambda_i, \tau_{\delta(i)}^{(i)}(x^{(i)}), \delta(i))=f(x^{(i)},u^{(i)})$. In this embodiment, the function f may be a non-secret function, or the function f may be a secret function (e.g. f may be the composition of a non-secret function and a white-box encoding).

Figure 6C:
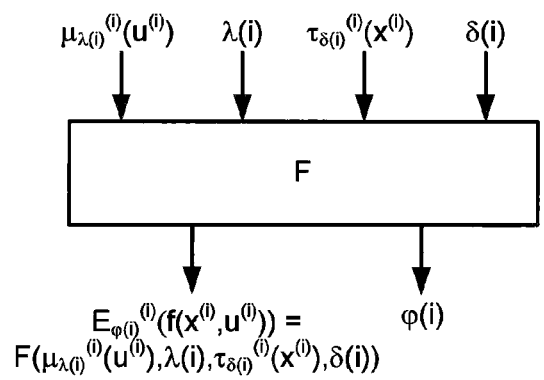
FIG. 6c schematically illustrates the processing performed by a function F as implemented by a white-box implementation according to an embodiment of the invention.

FIG. 6c schematically illustrates the processing performed by the function F as implemented by the white-box implementation 460 according to another embodiment of the invention (as above, the function F may depend on the index i of the unit 500 and the corresponding encoded unit 510). FIG. 6c is the same as FIG. 6b (and hence the above description applies analogously), except that the output $f(x^{(i)},u^{(i)})$ of the function F is encoded using an output-encoding out from a set of available output-encodings to form the output of the function F shown in FIG. 6c. In particular, there may be available a plurality of output-encodings $G^{(i)}:=\{E_{\varphi(i)}^{(i)}|1\leq\varphi(i)\leq t^{(i)}, \gamma_{\varphi(i)}$ is an invertible mapping from $OD^{(i)}$ to $OC^{\varphi(i)}\}$, where $t^{(i)}$ is the number of output-encodings associated with the value $f(x^{(i)},u^{(i)})$, $OD^{(i)}$ is the domain of an output-encoding $E_{\varphi(i)}^{(i)}$ (which is defined as the range of possible values that the output value $f(x^{(i)}, u^{(i)})$ can assume), and $OC^{\varphi(i)}$ is the codomain of an output-encoding $E_{\varphi(i)}^{(i)}$ (with respect to the domain and codomains of an encoding in $G^{(i)}$, similar reasoning applies as described above for the domains and codomains of the encodings in a set $U^{(i)}$). The value $f(x^{(i)},u^{(i)})$ is encoded based on one of these output-encodings, i.e. the output of the function F equals $E_{\varphi(i)}^{(i)}(f(x^{(i)},u^{(i)}))$ for some $E_{\varphi(i)}^{(i)}$ in $G^{(i)}$. The index $\varphi(i)$ associated with $E_{\varphi(i)}^{(i)}$ may be an additional output of the function F (as shown in FIG. 6c). The particular choice of output-encoding to use (i.e. the index $\varphi(i)$) may be dependent on one or both of the index $\lambda(i)$ and the index $\delta(i)$. Preferably the index $\varphi(i)$ is dependent on both the index $\lambda(i)$ and the index $\delta(i)$—as will be illustrated shortly, this helps ensure that an adversary cannot use the white-box implementation to verify if non-encoded units 500 associated with differently encoded units 510 are equal. Additionally or alternatively, the index $\varphi(i)$ may be dependent on the value $\mu_{\lambda(i)}^{(i)}(u^{(i)})$—in this way the index $\varphi(i)$ is still dependent (albeit implicitly) on the index $\lambda(i)$. Additionally or alternatively, the index $\varphi(i)$ may be dependent on the value $\tau_{\delta(i)}^{(i)}(x^{(i)})$—in this way the index $\varphi(i)$ is still dependent (albeit implicitly) on the value $\delta(i)$.

Figure 7:
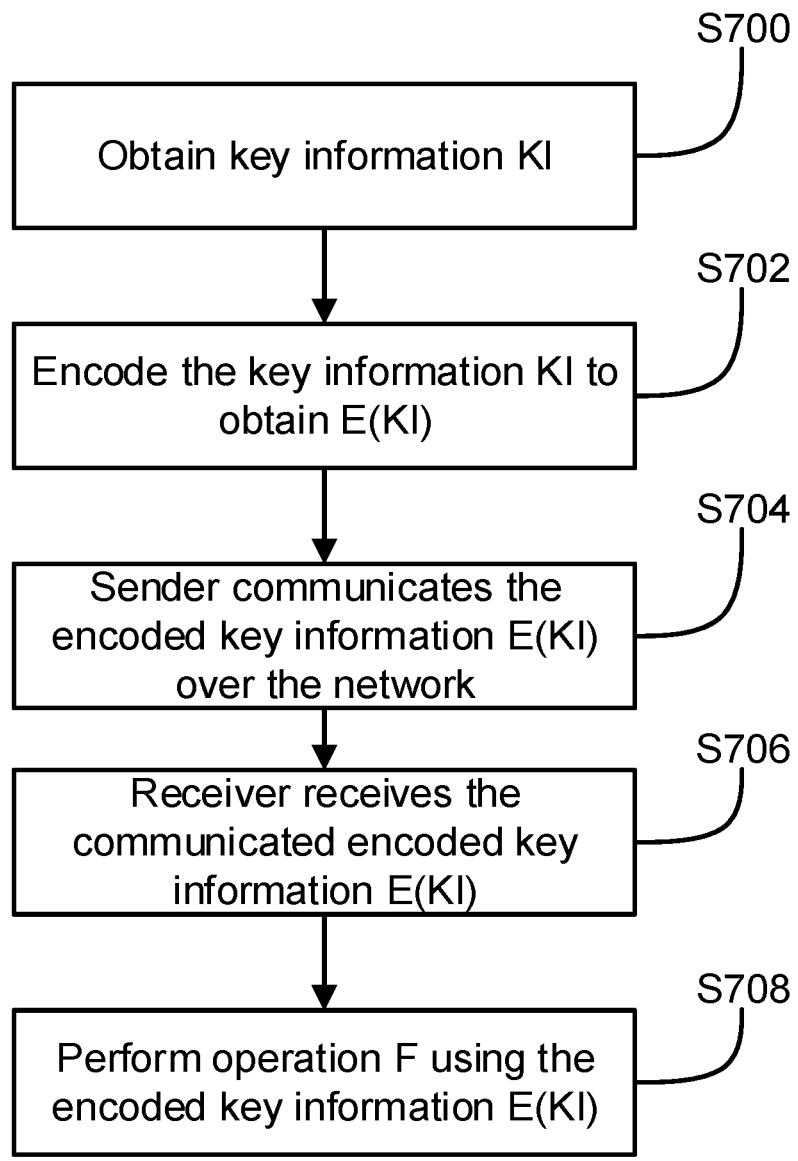
FIG. 7 is a flowchart schematically illustrating the processing performed according to embodiments of the invention.

FIG. 7 is a flowchart schematically illustrating the processing performed according to embodiments of the invention.

At a step S700, the key information obtaining module 418 obtains the key information KI as set out above.

At a step S702, the encoding module 420 encodes the key information KI obtained by the key information obtaining module 418. The output of this encoding is the encoded key information E(KI).

At a step S704, the sender 410 communicates the encoded key information E(KI) over the network 430 to the receiver 450.

At a step S706, the receiver 450 receives the communicated encoded key information E(KI).

At a step S708, the white-box implementation 460 at the receiver 450 performs the operation F using the encoded key information E(KI) to generate an output that is dependent, at least in part, on the original/initial key information KI.

Figure 2:
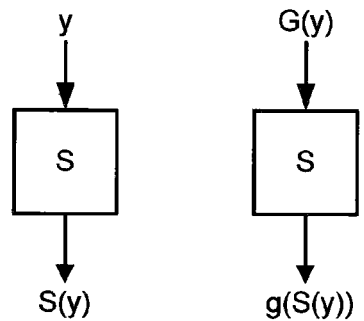
FIG. 2 illustrates the concept of an S-box and self-equivalences thereof.
Figure 3:
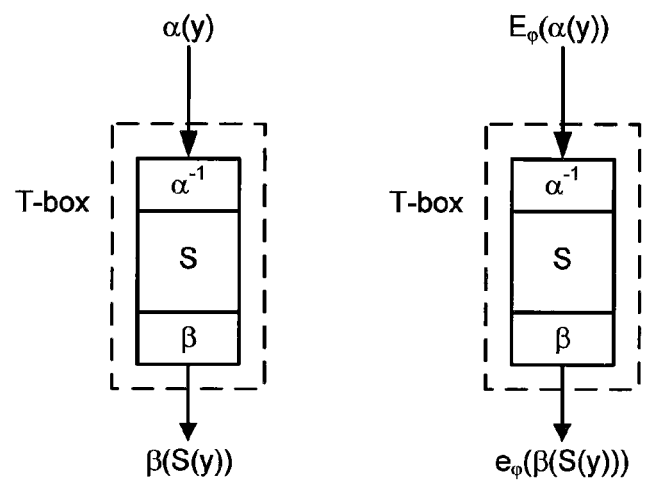
FIG. 3 illustrates how a T-box may be formed from an S-box.

A particular example will now be described in which the white-box implementation 460 is a white-box implementation of the AES algorithm, with reference to the operation illustrated in FIGS. 1c, 2 and 3. However, it will be appreciated that this is purely to help explain the invention and should not be taken as limiting the scope of the claims.

In the examples given below, the units 500, the encoded units 510 and the intermediate results are each one byte in size, so that the various encodings used are mappings from $Z_2^8$ to $Z_2^8$. However, it will be appreciated that this is merely exemplary and that the invention is not limited in this way.

When generating a white-box implementation 460 of AES, for every AES round key byte (indexed by i), a set of encodings $U^{(i)}=\{\mu_{\lambda(i)}^{(i)}|1\leq\lambda(i)\leq n^{(i)}, \mu_{\lambda(i)}^{(i)}$ is an invertible mapping from $Z_2^8$ to $Z_2^8\}$ is selected. These encodings may be affine. For some white-box implementations 460, some of these sets $U^{(i)}$ may be identical for different round key bytes (which can help reduce the size of the white-box implementation 460). Alternatively, each round key byte may be associated with a set $U^{(i)}$ that is unique to that round key byte.

If a new AES key is to be distributed to the white-box implementation 460, then the key information obtaining module 418 uses the AES key scheduling algorithm to generate all of the AES round keys from the new AES key—these AES round keys then form the key information KI. Let B denote the number of bytes of the key information KI (i.e. the total number of round key bytes; that is B=176 for AES-128, B=208 for AES-192 and B=240 for AES-256). For each value of i ($1\leq i\leq B$), the encoding module 420 encodes the round key byte i using an encoding $\mu_{\lambda(i)}^{(i)}$ taken from its associated set $U^{(i)}$ of encodings. In particular, for each value of i ($1\leq i\leq B$), the encoding module 420 may select a value $\lambda(i)$ (with $1\leq\lambda(i)\leq n^{(i)}$) and then apply the encoding $\mu_{\lambda(i)}^{(i)}$ to the value of round key byte i. The set of encoded round key bytes form the encoded key information E(KI). The sender 410 then provides (or communicates or distributes) the encoded key information E(KI) to the white-box implementation 460 of one or more receivers 450. The sender 410 may also provide the selected indices $\lambda(i)$ (for $1\leq i\leq B$) to the white-box implementation 460 of the one or more receivers 450 but, as mentioned above, the white-box implementation 460 of the one or more receivers 450 may be arranged to obtain these selected indices in other ways.

In practice, the size of each index $\lambda(i)$ can be small, for example 4 bits for every round key byte (for example, by selecting a set $U^{(i)}$ containing 16 encodings for each value of i). Hence, the key update size can be kept small: in particular, updating a key involves providing the encoded key information E(KI) and, potentially, additionally providing a set of indices $\lambda(i)$—for AES-128, there are 176 bytes of key information KI, and hence the size of the index information is 176×(4/8) bytes=88 bytes if each index is 4 bits.

Note that, if round key byte i has the same value for different AES keys (for example, for a first AES key that was subsequently superseded/updated by a second AES key), then these round key bytes can be encoded differently using a different value of $\lambda(i)$, as the value of $\lambda(i)$ can be chosen by the party generating and encoding each AES key. Similarly, different round key bytes within the same set of round keys for a single AES key (i.e. different round key bytes within an expanded AES key) can be encoded differently from each other even if the associated sets of encodings are identical (assuming that the sets contain at least two encodings). All of this helps improve the security of the white-box implementation, as has been described above.

In the following, examples of how the white-box implementation 460 may implement the AES key addition layer are provided. In these examples, it is assumed without loss of generality that a round key addition layer is followed by a substitution layer. This applies to all AES key addition layers and AES substitution layers, with the exception of the final AES round key addition layer. Suitable adjustments to the described examples can be made if the order of the round key addition layer and the substitution layer is reversed, in ways which will be familiar to the skilled person. Each of the following examples satisfies the property that an adversary cannot use the white-box implementation 460 of the round key addition layer to verify if the values of two round key bytes associated with two differently encoded round key bytes are equal. For ease of explanation, the processing performed by the white-box implementation 460 for a single round key byte is considered in the following discussion, and hence, for ease of notation, the index i is omitted. It will be appreciated that these examples are purely exemplary and that their principles apply to other functions F—in particular so that an adversary cannot use the white-box implementation 460 of the function F to verify if two units 500 associated with two differently encoded units 510 assume the same value.

For ease of exposition and without loss of generality, it is assumed in the following examples that all white-box encodings are invertible affine mappings. Additional non-linear white-box encodings may be added to the implementation after the techniques described in the examples have been applied, in ways which will be familiar to the skilled person. Further, if a white-box encoding has been selected from a set of encodings, then the index of the encoding is included as a subscript of the encoding in the following (to be able to easily distinguish such encodings from fixed white-box encodings in the examples).

Figure 1A:
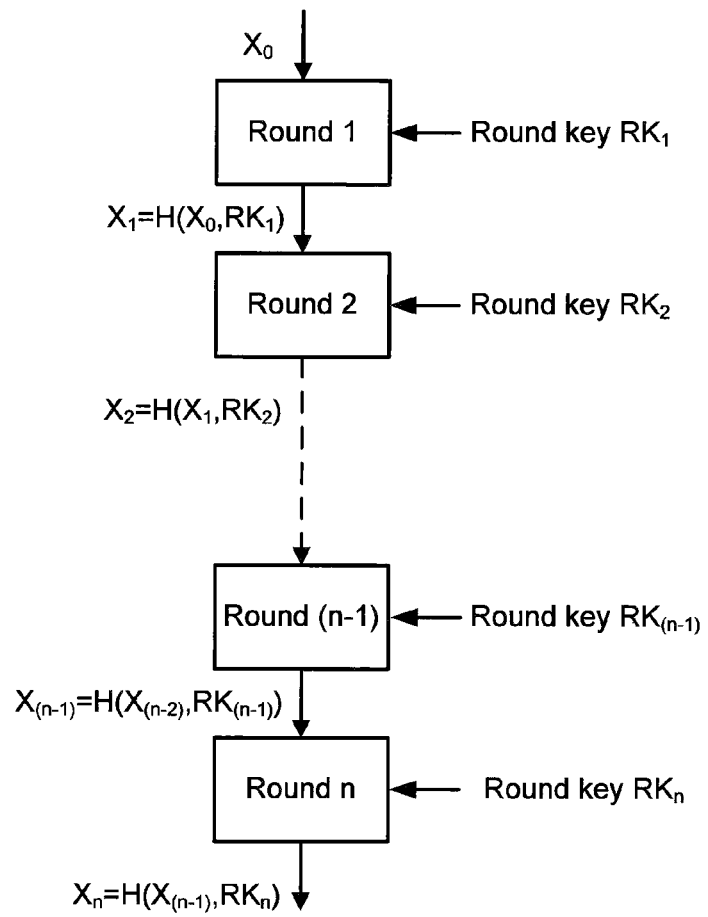
FIG. 1a illustrates the concept of an iterated block cipher.
Figure 1B:
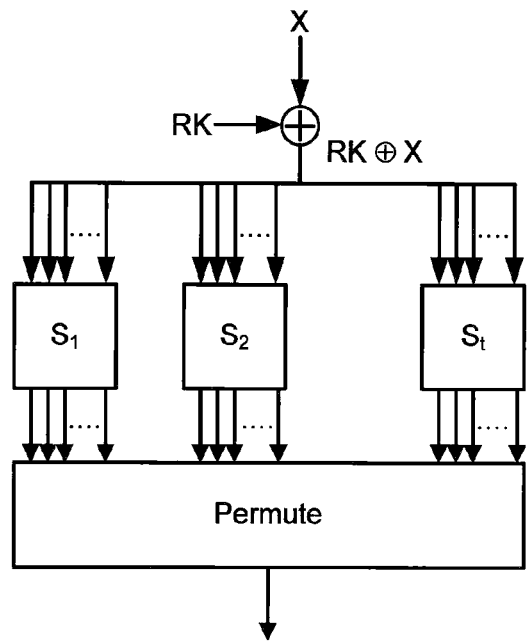
FIG. 1b illustrates an example round function of a substitution-permutation network, involving a round key addition layer, a substitution layer and a linear transformation or permutation layer.
Figure 1C:
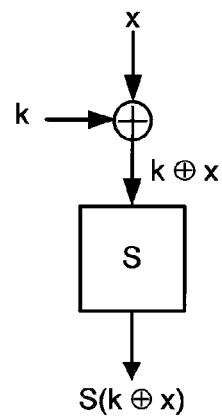
FIG. 1c illustrates an operation involved in the processing of FIG. 1b.
Figure 8:
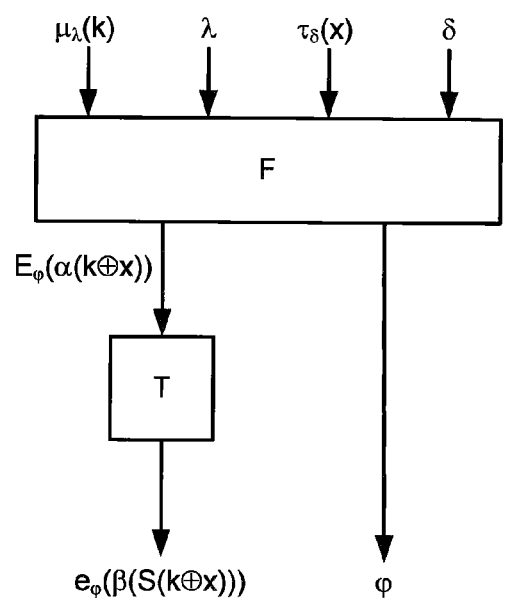
FIG. 8 schematically illustrates an encoded version of the operation of FIG. 1c.

FIG. 8 schematically illustrates an encoded version of the operation shown in FIG. 1c. In the example depicted in FIG. 8, it is assumed that the operation is part of an AES encryption or decryption operation, and that the AES S-box is encoded as shown in FIG. 3. The function F in FIG. 8 computes the XOR of a round key byte k (i.e. a unit 500 of key information KI) and a data byte x in an encoded way, and the T-box computes the AES S-box operation in an encoded way. The four inputs to the function F are: an encoded round key byte $\mu_\lambda(k)$ together with the index $\lambda$ of the encoding applied to the round key byte k and a variably encoded data byte $\tau_\delta(x)$ together with the index $\delta$ of the variable encoding applied to the data byte x, $\tau_\delta$ being selected from a set $\{\tau_\delta|\tau_\delta$ is an affine mapping from $Z_2^8$ to $Z_2^8\}$ consisting of white-box encodings associated with the data byte x. The outputs of the function F are a variably encoded XOR of the data byte x and the round key byte k, denoted by $E_\varphi(\alpha(k\oplus x))$, together with the index $\varphi$ of the variable encoding applied to $\alpha(k\oplus x)$ the function $E_\varphi$ shall be referred to as a variable "output-encoding", there being a plurality of available output-encodings (which could, for example, be functions that are part of the self-equivalences of the encoded S-box in FIG. 3; the encoded S-box is referred to as a T-box in FIGS. 3 and 8). The output $E_\varphi(\alpha(k\oplus x))$ of F is the input to the T-box, as depicted in FIG. 8. In the embodiment shown in FIG. 8, $\alpha$ and $\beta$ are invertible affine white-box encodings from $Z_2^8$ to $Z_2^8$ (as in the example depicted in FIG. 3). The second output of F is the index $\varphi$ of the variable output-encoding applied to $\alpha(k\oplus x)$.

Preferably, the value of the index $\varphi$ in the output of F depends on the value of the index $\delta$. In particular, if $\varphi$ would not depend on $\delta$, then an adversary can use the white-box implementation to generate the two outputs of F corresponding to two inputs $(\mu_\lambda(k), \lambda, \tau_{\delta 1}(x_1), \delta 1)$ and $(\mu_\lambda(k), \lambda, \tau_{\delta 2}(x_2), \delta 2)$ to F with $\delta 1\neq\delta 2$ (e.g. the adversary can generate such inputs and outputs of F by executing the white-box implementation of AES using different data inputs and the same key); these outputs are $E_\varphi(\alpha(k\oplus x_1))$ and $E_\varphi(\alpha(k\oplus x_2))$, respectively, for some value of $\varphi$. These two outputs are equal if and only if $x_1=x_2$. In other words, the adversary could try to use the (white-box) implementation of F to verify if two input data bytes are equal, thereby "undoing" the effect of the variable encoding $\tau_\delta$ applied to the intermediate result (that is, to the data byte x). Thus, to ensure that the value of $\varphi$ can change in different executions of the implementation when using the same encoded round key byte $\mu_\lambda(k)$ (in order to prevent the attacks presented in BILLET and MICHIELS), the function F preferably selects the value of $\varphi$ in dependence on $\delta$.

Additionally, to ensure that an adversary cannot use the white-box implementation 460 of the round key addition layer to verify if round key bytes associated with differently encoded round key bytes are equal, an adversary should not be able to use the white-box implementation of F to transform two encoded round keys bytes $\mu_{\lambda,1}(k_1)$ and $\mu_{\lambda,2}(k_2)$ with $\lambda 1 \neq \lambda 2$ (e.g. associated with two AES keys) to a value that can be used to verify if the value of $k_1$ is equal to the value of $k_2$. For example, if the index $\varphi$ of the variable encoding applied to the output $\alpha(k \oplus x)$ would only depend on the value of $\delta$ (that is, $\varphi = g(\delta)$ for some, possibly non-secret, function g) then the adversary could use the white-box implementation to generate the two outputs of F corresponding to two inputs $(\mu_{\lambda,1}(k_1), \lambda 1, \tau_\delta(x), \delta)$ and $(\mu_{\lambda,2}(k_2), \lambda 2, \tau_\delta(x), \delta)$ to F with $\lambda 1 \neq \lambda 2$ (e.g. the adversary can generate such inputs and outputs of F by executing the white-box implementation of AES using the same data input and the same round keys, except for the encoded round keys bytes $\mu_{\lambda,1}(k_1)$ and $\mu_{\lambda,2}(k_2)$); these outputs are $E_\varphi(\alpha(k_1 \oplus x))$ and $E_\varphi(\alpha(k_2 \oplus x))$, respectively, for some value of $\varphi$. The outputs are equal if and only if $k_1 = k_2$. To prevent such an attack, the function F preferably selects the index $\varphi$ in dependence on both $\lambda$ and $\delta$, for example $\varphi = g(\lambda, \delta)$ for some, possibly non-secret, function g. The function g may be chosen in such a way that for every value of $\delta$, the index $\varphi$ of the variable encoding applied to $\alpha(k \oplus x)$ changes whenever the value of $\lambda$ changes. In particular, with such a choice of g, the outputs of F corresponding to the two inputs $(\mu_{\lambda,1}(k_1), \lambda 1, \tau_\delta(x), \delta)$ and $(\mu_{\lambda,2}(k_2), \lambda 2, \tau_\delta(x), \delta)$ with $\lambda 1 \neq \lambda 2$ are encoded using different (variable) encodings $\varphi 1$ and $\varphi 2$.

Thus, in summary, the index $\varphi$ is preferably dependent on both $\lambda$ and $\delta$.

In some embodiments, as discussed below, further measures may be taken to help improve security.

For example, if $\varphi = g(\lambda, \delta)$, then two inputs $(\mu_\lambda(k_1), \lambda, \tau_\delta(x_1), \delta)$ and $(\mu_\lambda(k_2), \lambda, \tau_\delta(x_2), \delta)$ map to outputs $E_\varphi(\alpha(k_1 \oplus x_1))$ and $E_\varphi(\alpha(k_2 \oplus x_2))$ using the same white-box encoding $E_\varphi \circ \alpha$. If these outputs are equal, then a relation between $x_1$, $x_2$, $k_1$ and $k_2$ is revealed (the relation being $k_1 \oplus x_1 = k_2 \oplus x_2$). Thus, in some embodiments, the value of $\varphi$ (as determined by the function g) may depend on $\mu_\lambda(k)$ and/or $\tau_\delta(x)$ to prevent that two inputs $(\mu_\lambda(k_1), \lambda, \tau_\delta(x_1), \delta)$ and $(\mu_\lambda(k_2), \lambda, \tau_\delta(x_2), \delta)$ map to outputs using the same variable encoding $E_\varphi \circ \alpha$. Such a function g then depends implicitly on the values of $\lambda$ and/or $\delta$. In general, g may depend on any combination of the four inputs of F as long as g is dependent on $\lambda$ and $\delta$ (either explicitly or implicitly).

Figure 9:
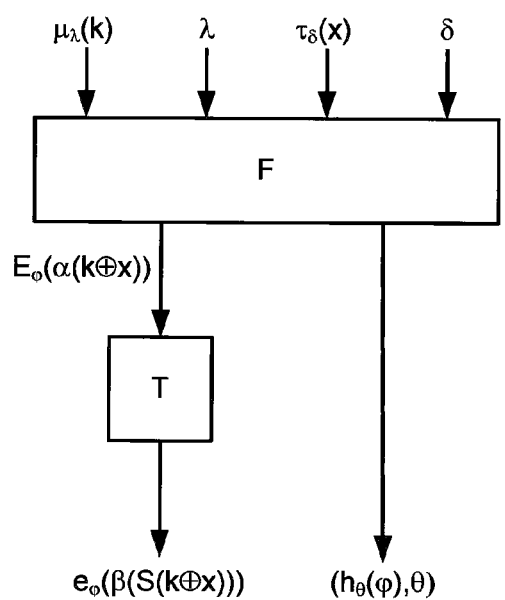
FIG. 9 schematically illustrates a variant of the operation of FIG. 8.

As a further example, there may exist different inputs $(\mu_{\lambda,1}(k_1), \lambda 1, \tau_{\delta 1}(x_1), \delta 1)$ and $(\mu_{\lambda,2}(k_2), \lambda 2, \tau_{\delta 2}(x_2), \delta 2)$ to the function F that map to outputs $E_\varphi(\alpha(k_1 \oplus x_1))$ and $E_\varphi(\alpha(k_2 \oplus x_2))$ using the same white-box encoding $E_\varphi \circ \alpha$. If these outputs are equal and if it is known to the adversary that the same white-box encoding $E_\varphi \circ \alpha$ is applied to both outputs, then a relation between $x_1$, $x_2$, $k_1$ and $k_2$ is revealed (the relation being $k_1 \oplus x_1 = k_2 \oplus x_2$). To reduce the amount of information available to an adversary, in some embodiments the number of variable output-encodings that can be applied to the output (indexed by $\varphi$) may be larger than the number of variable encodings that can be applied to the input data byte (indexed by $\delta$). For example, the function $g(\mu_\lambda(k), \lambda, \tau_\delta(x), \delta)$ may be chosen in such a way that no two different inputs $(\mu_{\lambda,1}(k_1), \lambda 1, \tau_{\delta 1}(x_1), \delta 1)$ and $(\mu_{\lambda,2}(k_1), \lambda 2, \tau_{\delta 2}(x_2), \delta 2)$ to the function F map to outputs using the same value of $\varphi$ (in other words, the function g is an injective function with respect to the output $\varphi$). Although this prevents the attack described above, the number of possible values of $\varphi$ is bounded above by the number of self-equivalences of the T-box. For AES this number equals 2040, which is (far) less than the number of possible inputs to the function F (for example, if $\lambda$ and $\delta$ are 4-bit values and if the encoded round key byte and the encoded data byte are 8-bit values, then the number of inputs to F equals $2^{24} = 16,777,216$). Hence, in some embodiments, the function F, instead of outputting the index $\varphi$, outputs an encoded form of $\varphi$, where $\varphi$ is encoded using one of the encodings in a set $H = \{h_\theta | h_\theta$ is a secret, invertible affine mapping$\}$ to reduce the amount of information available to an adversary. In other words, in such embodiments the function F outputs $(h_\theta(\varphi), \theta)$ instead of simply outputting $\varphi$ (as shown in FIG. 9). In general, in such embodiments, the value of $\theta$ depends on at least a part of the input to the function F. Preferably, this dependency is chosen in such a way that the value of $\theta$ is different for any two inputs to the function F that map to an output using the same white-box encoding $E_\varphi \circ \alpha$. With such a choice, it is impossible for an adversary to determine that two outputs $E_\varphi(\alpha(k_1 \oplus x_1))$ and $E_\varphi(\alpha(k_2 \oplus x_2))$ are encoded using the same variable encoding $E_\varphi$.

The function F can be implemented as a single look-up table. However, the size of such a table can be large. For example, if $\lambda$ and $\delta$ are 4-bit values and if the encoded round key byte and the encoded data byte are 8-bit values, then the size of the input to the function F is 24 bits. Thus, if the function F is implemented as a single look-up table, then the table implementing the function F has $2^{24} = 16,777,216$ entries.

Figure 10:
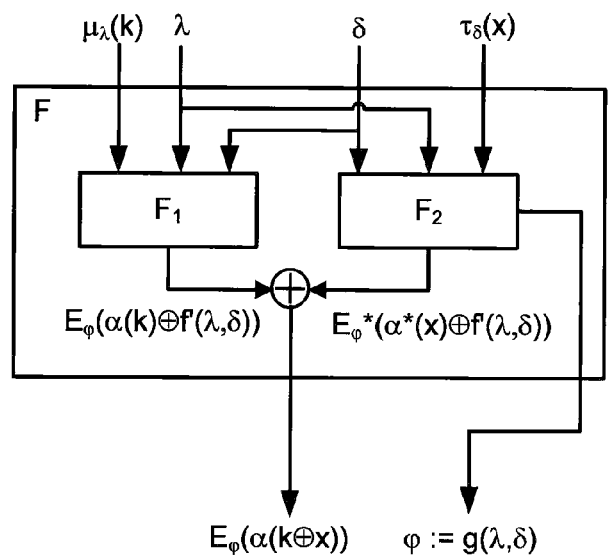
FIG. 10 schematically illustrates an embodiment that implements a function F so as to use a reduced look-up table size.

FIG. 10 schematically illustrates an embodiment that implements the function F using a smaller total look-up table size. As before, it is assumed that the white-box encodings $\mu_\lambda$ and $\tau_\delta$ are invertible affine mappings (from $Z_2^8$ to $Z_2^8$ as, in this embodiment, the size of a unit is a byte, although this is purely exemplary). As in FIGS. 8 and 9, the function F has four inputs: an encoded round key byte $\mu_\lambda(k)$ together with the index $\lambda$ of the encoding applied to the round key byte k and an encoded data byte $\tau_\delta(x)$ together with the index $\delta$ of the variable encoding applied to the data byte x.

In the embodiment of FIG. 10, the function F is implemented in the white-box implementation 460 using the two functions $F_1$ and $F_2$ and an XOR operation this reduces the total size of the look-up tables required.

The inputs to the function $F_1$ are the encoded round key byte $\mu_\lambda(k)$ and the two indices $\lambda$ and $\delta$ of the encoding applied to the round key byte k and the variable encoding applied to the data byte x, respectively. The output of the function $F_1$ is $E_\varphi(\alpha(k) \oplus f'(\lambda, \delta))$ for some secret function f' mapping the two indices $\lambda$ and $\delta$ to a value in $Z_2^8$. Further, in FIG. 10 it is assumed that the index $\varphi$ of the variable encoding $E_\varphi$ applied to $\alpha(k) \oplus f'(\lambda, \delta)$ equals $g(\lambda, \delta)$. However, as mentioned, in general, g may depend on any combination of the four inputs of the function F as long as g is dependent on $\lambda$ and $\delta$ (either explicitly or implicitly).

The inputs to the function $F_2$ are the variable encoded data byte $\tau_\delta(x)$ and the two indices $\lambda$ and $\delta$ of the encoding applied to the round key byte k and the variable encoding applied to the data byte x, respectively. In the following, the notation $\alpha^*$ is used to denote the linear part of an affine mapping $\alpha$ (in particular, note that $\alpha(x) + \alpha^*(y) = \alpha(x+y)$ for all values of x and y). The output of the function $F_2$ is $E_\varphi^*(\alpha^*(x) \oplus f(\lambda,\delta))$, using the same function f as in the output of the function $F_1$.

An equivalent way of describing the outputs of the functions $F_1$ and $F_2$ is to denote the outputs by $E_\varphi(\alpha(k)) \oplus h(\lambda,\delta)$ and $E_\varphi^*(\alpha^*(x)) \oplus h(\lambda,\delta)$, respectively. The relationship between $f(\lambda,\delta)$ and $h(\lambda,\delta)$ is given by $h(\lambda,\delta) = E_\varphi^*(f(\lambda,\delta))$. Alternatively, the outputs of the functions $F_1$ and $F_2$ can be described as $E_\varphi(\alpha(k \oplus j(\lambda,\delta)))$ and $E_\varphi^*(\alpha^*(x \oplus j(\lambda,\delta)))$, respectively. In this case the relationship between $f(\lambda,\delta)$ and $j(\lambda,\delta)$ is given by $f(\lambda,\delta) = \alpha^*(j(\lambda,\delta))$.

The outputs of functions $F_1$ and $F_2$ are added in $Z_2^8$ (i.e. XOR-ed), producing $E_\varphi(\alpha(k \oplus x))$ (using the fact that $f(\lambda,\delta) \oplus f(\lambda,\delta) = 0$ for all values of $\lambda$ and $\delta$). $E_\varphi(\alpha(k \oplus x))$ is then one of the outputs of the function F. Notice that $E_\varphi$ and $\alpha$ are used in the output of the function $F_1$, and that $E_\varphi^*$ and $\alpha^*$ are used in the output of the function $F_2$ (that is, only the linear parts of $E_\varphi$ and $\alpha$ are used in the output of $F_2$). Different variants of this implementation are possible: (1) the output of the function $F_1$ is $E_\varphi^*(\alpha(k) \oplus f(\lambda,\delta))$ and the output of the function $F_2$ is $E_\varphi(\alpha^*(x) \oplus f(\lambda,\delta))$, (2) the output of the function $F_1$ is $E_\varphi(\alpha^*(k) \oplus f(\lambda,\delta))$ and the output of the function $F_2$ is $E_\varphi^*(\alpha(x) \oplus f(\lambda,\delta))$, and (3) the output of the function $F_1$ is $E_\varphi^*(\alpha^*(k) \oplus f(\lambda,\delta))$ and the output of the function $F_2$ is $E_\varphi(\alpha(x) \oplus f(\lambda,\delta))$. Note that the result of the addition in $Z_2^8$ of the outputs of the functions $F_1$ and $F_2$ is equal to $E_\varphi(\alpha(k \oplus x))$ for all these variants.

As the index $\varphi = g(\lambda,\delta)$ needs to be maintained in the white-box implementation, it is also shown as an output of the function F in FIG. 10. In this embodiment, it is assumed without loss of generality that $\varphi$ is output of the function $F_2$. However, $\varphi$ may also be an output of the function $F_1$ instead. Alternatively, the function F may implement a separate function that generates $\varphi$ in dependence on both $\lambda$ and $\delta$.

In preferred embodiments, an adversary should not be able to use the white-box implementation of the function F to transform 2 encoded round keys bytes $\mu_{\lambda,1}(k_1)$ and $\mu_{\lambda,2}(k_2)$ with $\lambda 1 \neq \lambda 2$ to a value that can be used to verify if the value of $k_1$ is equal to the value of $k_2$. To satisfy the property, the index $\varphi$ is made dependent on $\lambda$ and $\delta$, and the secret function f is used to "mask" the outputs of the functions $F_1$ and $F_2$. To explain the purpose of the "masking function" f, assume that an adversary knows two encoded round key bytes $\mu_{\lambda,1}(k_1)$ and $\mu_{\lambda,2}(k_2)$ and the values of $\lambda 1$ and $\lambda 2$. If f would not be used (in other words, if the output of $F_1$ would be equal to $E_\varphi(\alpha(k))$, then the adversary may be able to determine a pair ($\delta 1$, $\delta 2$) with the property that the two inputs ($\mu_{\lambda,1}(k_1)$, $\lambda 1$, $\delta 1$) and ($\mu_{\lambda,2}(k_2)$, $\lambda 2$, $\delta 2$) with $\lambda 1 \neq \lambda 2$ to the function $F_1$ map to $E_\varphi(\alpha(k_1))$ and $E_\varphi(\alpha(k_2))$ for some known value of $\varphi$ (note that the adversary can obtain the value of $\varphi$ using the function $F_2$). That is, the adversary would be able to use the implementation of the function F to obtain encoded versions of $k_1$ and $k_2$ using the same known encoding $E_\varphi \circ \alpha$. If $E_\varphi(\alpha(k_1))$ equals $E_\varphi(\alpha(k_2))$, then the adversary knows that the values of $k_1$ and $k_2$ are equal. The use of the function f can prevent this by masking the outputs of the functions $F_1$ and $F_2$: if $k_1 = k_2$ and $f(\lambda 1, \delta 1) \neq f(\lambda 2, \delta 2)$, then $E_\varphi(\alpha(k_1) \oplus f(\lambda 1,\delta 1)) \neq E_\varphi(\alpha(k_2) \oplus f(\lambda 2,\delta 2))$.

The function f also prevents an adversary from using the function $F_2$ to verify if two data bytes $x_1$ and $x_2$ in two different executions of the white-box implementation are equal. That is, if f is omitted, then an adversary may be able to determine a pair ($\lambda 1$, $\lambda 2$) with the property that the two inputs ($\lambda 1$, $\delta 1$, $\tau_{\delta 1}(x_1)$) and ($\lambda 2$, $\delta 2$, $\tau_{\delta 2}(x_2)$) with $\delta 1 \neq \delta 2$ to the function $F_2$ map to $E_\varphi(\alpha(x_1))$ and $E_\varphi(\alpha(x_2))$ (the adversary may obtain ($\delta 1, \tau_{\delta 1}(x_1)$) and ($\delta 2, \tau_{\delta 2}(x_2)$) with $\delta 1 \neq \delta 2$ by executing the white-box implementation of AES using different inputs). As the index $\varphi$ is known to the adversary, and as these outputs are encoded using the same encoding $E_\varphi \circ \alpha$, the outputs can be used to verify if $x_1$ is equal to $x_2$. This is undesirable for two reasons. First, the objective of the variable encoding applied to a data byte is to hide if the values of the data byte are equal in different executions of the algorithm. Second, if an adversary knows that $x_1 = x_2$, then the output of the function F can be used to verify if two round key bytes encoded as $K_1(k_1)$ as $\mu_{\lambda,2}(k_2)$ with $\lambda 1 \neq \lambda 2$ are equal. More precisely, the outputs of the function F associated with the inputs ($\mu_{\lambda,1}(k_1)$, $\lambda 1$, $\tau_{\delta 1}(x_1)$, $\delta 1$) and ($\mu_{\lambda,2}(k_2)$, $\lambda 2$, $\tau_{\delta 2}(x_2)$, $\delta 2$) are $E_\varphi(\alpha(k_1 \oplus x_1))$ and $E_\varphi(\alpha(k_2 \oplus x_2))$, respectively. If $x_1 = x_2$, then $E_\varphi(\alpha(k_1 \oplus x_1)) = E_\varphi(\alpha(k_2 \oplus x_2))$ if and only if $k_1 = k_2$.

The index $\varphi$ may (as previously described above with reference to FIG. 9) be encoded as $(h_\theta(\varphi),\theta)$. When such encoding is used, the function f may be omitted in the outputs of the functions $F_1$ and $F_2$. That is, in such embodiments the outputs of the functions $F_1$ and $F_2$ may be $E_\varphi(\alpha(k))$ and $E_\varphi^*(\alpha^*(x))$, respectively. Although an adversary can still detect equal outputs of the function $F_1$, that is, outputs for which $E_{\varphi 1}(\alpha(k_1)) = E_{\varphi 2}(\alpha(k_2))$, it is unknown to the adversary whether $\varphi 1$ equals $\varphi 2$ (unless the encoding $(h_{\theta 1}(\varphi 1),\theta 1)$ of $\varphi 1$ equals the encoding $(h_{\theta 2}(\varphi 2),\theta 2)$ of $\varphi 2$). Similar reasoning applies to the function $F_2$.

In the white-box implementation 460, the functions $F_1$ and $F_2$ may be implemented as look-up tables. In the embodiment illustrated in FIG. 10, the size of the look-up tables required is smaller that the size required if implementing the function F as a single look-up table. For example, if $\lambda$ and $\delta$ are 4-bit values and if the encoded round key byte and the encoded data byte are 8-bit values, then the size of the input to $F_1$ (and $F_2$) is 16 bits. That is, the two tables implementing $F_1$ and $F_2$ have $2^{16} = 65,536$ entries each.

Figure 11:
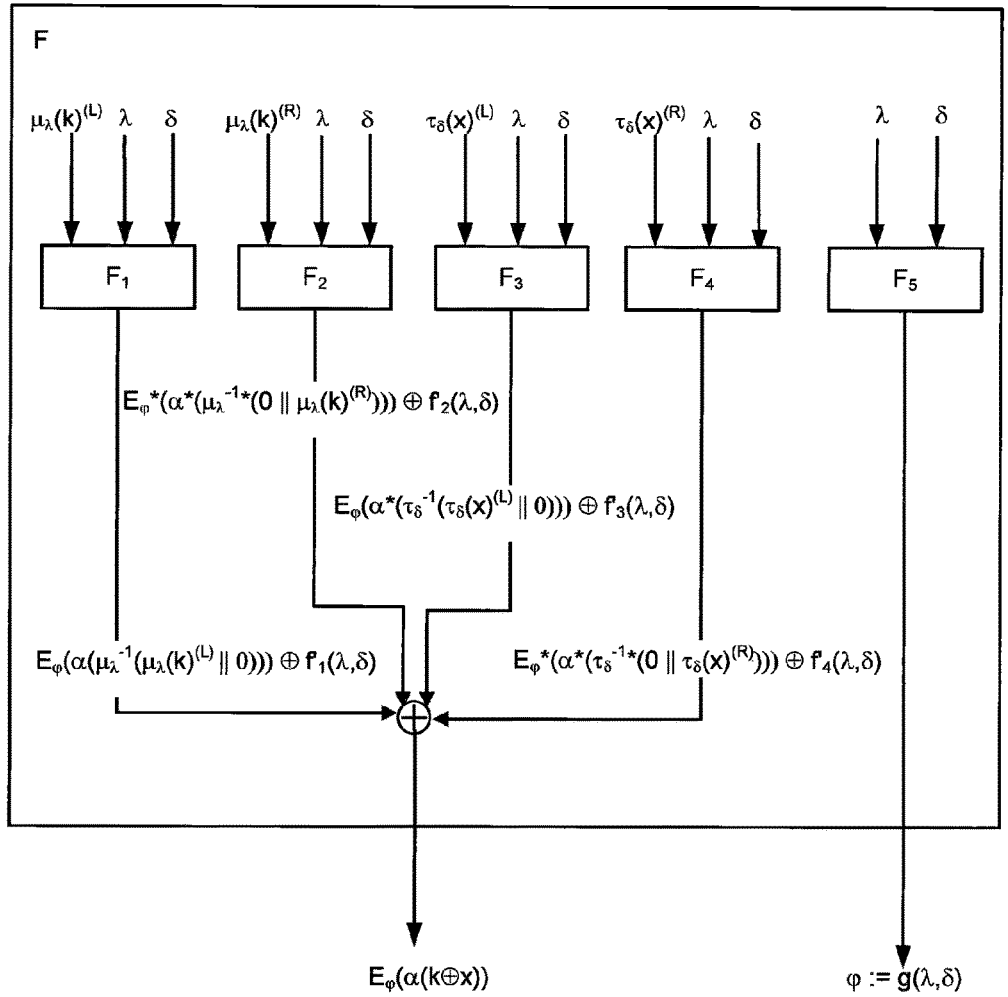
FIG. 11 schematically illustrates a further embodiment that implements a function F so as to use a reduced look-up table size.

FIG. 11 schematically illustrates an example implementation of the function F that further reduces the total look-up table size required. As before, it is assumed that the white-box encodings $\mu_\lambda$ and $\tau_\delta$ are invertible affine mappings (from $Z_2^8$ to $Z_2^8$ as, in this embodiment, the size of a unit is a byte, although this is purely exemplary). As in FIGS. 8-10, the function F has four inputs: an encoded round key byte $\mu_\lambda(k)$ together with the index $\lambda$ of the encoding applied to the round key byte k and an encoded data byte $\tau_\delta(x)$ together with the index $\delta$ of the variable encoding applied to the data byte x.

The function F first treats each of the inputs $\mu_\lambda(k)$ and $\tau_\delta(x)$ as two parts. For $\mu_\lambda(k)$, these parts are denoted by $\mu_\lambda(k)^{(L)}$ and $\mu_\lambda(k)^{(R)}$, so that $\mu_\lambda(k)$ is a concatenation of $\mu_\lambda(k)^{(L)}$ and $\mu_\lambda(k)^{(R)}$. A concatenation of parts is denoted by $\|$, i.e. $\mu_\lambda(k) = \mu_\lambda(k)^{(L)} \| \mu_\lambda(k)^{(R)}$; for $\tau_\delta(x)$, these parts are denoted by $\tau_\delta(x)^{(L)}$ and $\tau_\delta(x)^{(R)}$, so that $\tau_\delta(x)$ is a concatenation of $\tau_\delta(x)^{(L)}$ and $\tau_\delta(x)^{(R)}$, i.e. $\tau_\delta(x) = \tau_\delta(x)^{(L)} \| \tau_\delta(x)^{(R)}$ — here, $\|$ denotes the concatenation of two vectors or two amounts of data. The parts $\mu_\lambda(k)^{(L)}$ and $\mu_\lambda(k)^{(R)}$ may be a first and second half respectively of $\mu_\lambda(k)$; similarly, the parts $\tau_\delta(x)^{(L)}$ and $\tau_\delta(x)^{(R)}$ may be a first and second half respectively of $\tau_\delta(x)$. The function F implements four similar functions $F_1$, $F_2$, $F_3$ and $F_4$: each of these functions takes one of the four parts (that is, one of $\mu_\lambda(k)^{(L)}$, $\mu_\lambda(x)^{(L)}$, $\tau_\delta(x)^{(L)}$, $\tau_\delta(x)^{(R)}$) and the indices $\lambda$ and $\delta$ as input, as shown in FIG. 11. The functions $F_1$, $F_2$, $F_3$ and $F_4$ may be implemented as respective look-up tables indexed by their respective inputs. The outputs of the function $F_1$, $F_2$, $F_3$ and $F_4$ in this example are:

$$E_\varphi(\alpha(\mu_\lambda^{-1}(\mu_\lambda(k)^{(L)} \| 0))) \oplus f'_1(\lambda,\delta),$$

$$E_\varphi^*(\alpha^*(\mu_\lambda^{-1}(0 \| \mu_\lambda(k)^{(R)}))) \oplus f'_2(\lambda,\delta),$$

$E_\varphi(\alpha^*(\tau_\delta^{-1}(\tau_\delta(x)^{(L)}\|0)))\oplus f'_3(\lambda,\delta)$, and $E_\varphi{}^*(\alpha^*(\tau_\delta^{-1}*(0\|\tau_\delta(x)^{(R)})))\oplus f'_4(\lambda,\delta)$, respectively. The functions $f'_i$ (i=1, 2, 3, 4) are secret "masking functions" implemented by the white-box implementation that map the two indices $\lambda$ and $\delta$ to a value in $Z_2^8$.

It is note that:

$E_\varphi(\alpha(\mu_\lambda^{-1}(\mu_\lambda(k)^{(L)}\|0)))\oplus E_\varphi{}^*(\alpha^*(\mu_\lambda^{-1}*(0\|\mu_\lambda(k)^{(R)})))=E_\varphi(\alpha(\mu_\lambda^{-1}(\mu_\lambda(k))))=E_\varphi(\alpha(k))$, and that $E_\varphi(\alpha^*(\tau_\delta^{-1}(\tau_\delta(x)^{(L)}\|0)))\oplus E_\varphi{}^*(\alpha^*(\tau_\delta^{-1}*(0\|\tau_\delta(x)^{(R)})))=E_\varphi(\alpha^*(\tau_\delta^{-1}(\tau_\delta(x))))=E_\varphi(\alpha^*(x))$.

This implies that the result of the XOR operation shown in FIG. 11 (i.e. the XOR of the four outputs from the functions F1, F2, F3 and F4) equals $E_\varphi{}^*(\alpha(k\oplus x))\oplus f'_1(\lambda,\delta)\oplus f'_2(\lambda,\delta)\oplus f'_3(\lambda,\delta)\oplus f'_4(\lambda,\delta)$. In this embodiment, the functions $f'_1$, $f'_2$, $f'_3$ and $f'_4$ are chosen in such a way that $f'_1(\lambda,\delta)\oplus f'_2(\lambda,\delta)\oplus f'_3(\lambda,\delta)\oplus f'_4(\lambda,\delta)$ is equal to the affine constant of $E_\varphi$ for all values of $\lambda$ and $\delta$. For this choice the result of the XOR operation equals $E_\varphi(\alpha(k\oplus x))$. As in FIGS. 8-10, $E_\varphi(\alpha(k\oplus x))$ is one of the outputs of the function F.

In an alternative embodiment, the output of the function F1 equals $E_\varphi{}^*(\alpha(\mu_\lambda^{-1}(\mu_\lambda(k)^{(L)}\|0)))\oplus f'_1(\lambda,\delta)$ (that is, only the linear part of the variable encoding $E_\varphi$ is used). In such an embodiment, the fact that $E_\varphi{}^*(\alpha(\mu_\lambda^{-1}(\mu_\lambda(k)^{(L)}\|0)))\oplus E_\varphi{}^*(\alpha^*(\mu_\lambda^{-1}*(0\|\mu_\lambda(k)^{(R)})))=E_\varphi{}^*(\alpha(k))$ implies that the output of the XOR operation equals $E_\varphi(\alpha(k\oplus x))\oplus f'_1(\lambda,\delta)\oplus f'_2(\lambda,\delta)\oplus f'_3(\lambda,\delta)\oplus f'_4(\lambda,\delta)$. In this case, the functions $f'_1$, $f'_2$, $f'_3$ and $f'_4$ are chosen in such a way that $f'_1(\lambda,\delta)\oplus f'_2(\lambda,\delta)\oplus f'_3(\lambda,\delta)\oplus f'_4(\lambda,\delta)=0$ for all values of $\lambda$ and $\delta$.

Embodiments of the invention preferably satisfy the requirement for that an adversary should not be able to use the white-box implementation 460 of the function F to transform 2 encoded round keys bytes $\mu_{\lambda,1}(k_1)$ and $\mu_{\lambda,2}(k_2)$ with $\lambda 1 \neq \lambda 2$ to a value that can be used to verify if the value of $k_1$ is equal to the value of $k_2$. The masking functions $f'_i$ (i=1, 2, 3, 4) are used to satisfy this property (instead of the function f used in the embodiment described with respect to FIG. 10), masking the outputs of the functions $F_1$, $F_2$, $F_3$ and $F_4$. The masking performed by the masking functions $f'_i$ (i=1, 2, 3, 4) means that an adversary cannot use the white-box implementation 460 to verify if differently encoded round key bytes are equal or if differently encoded data bytes are equal.

As in the example depicted in FIG. 10, the index $\varphi$ of the variable encoding applied to the output $E_\varphi(\alpha(k\oplus x))$ of the function F needs to be maintained in the white-box implementation 460. In the embodiment shown in FIG. 11, the index $\varphi$ is the output of a separate function $F_5$ (that takes the two indices $\lambda$ and $\delta$ as inputs and generates the index $\varphi$ as an output dependent on both input indices) again, the function $F_5$ may be implemented as a look-up table indexed by the input indices $\lambda$ and $\delta$.

The index $\varphi$ may (as previously described above with reference to FIG. 9) be encoded as $(h_\theta(\varphi),\theta)$. If such encoding is implemented, then the functions $f'_i$ (i=1, 2, 3, 4) may be omitted in the outputs of the functions $F_1$, $F_2$, $F_3$ and $F_4$. That is, in such embodiments the outputs of $F_1$, $F_2$, $F_3$ and $F_4$ may be equal, respectively, to:

$E_\varphi(\alpha(\mu_\lambda^{-1}(\mu_\lambda(k)^{(L)}\|0)))$, $E_\varphi{}^*(\alpha^*(\mu_\lambda^{-1}*(0\|\mu_\lambda(k)^{(R)})))$, $E_\varphi(\alpha^*(\tau_\delta^{-1}(\tau_\delta(x)^{(L)}\|0)))$, and $E_\varphi{}^*(\alpha^*(\tau_\delta^{-1}*(0\|\tau_\delta(x)^{(R)})))$.

The total size of the look-up tables required for the embodiment shown in FIG. 11 is smaller than the total size of the look-up tables required for the embodiment shown in FIG. 10. For example, if $\lambda$ and $\delta$ are 4-bit values and if the encoded round key byte and the encoded data byte are 8-bit values, then the size of the input to each $F_i$ (i=1, 2, 3, 4) is 12 bits; that is, the look-up tables implementing $F_1$, $F_2$, $F_3$ and $F_4$ each have $2^{12}$=4,096 entries.

It will be appreciated that embodiments of the invention may be implemented using different configurations of different numbers of functions (and corresponding look-up tables). For example, the function F may treat the input $\mu_\lambda(k)$ as r different parts (which, when combined, form the input $\mu_\lambda(k)$) and, similarly, the function F may treat the input $\tau_\delta(x)$ as s different parts (which, when combined, form the input $\tau_\delta(x)$), where r and s are integers greater than 1—the function F may then be implemented with analogous sets of functions $F_i$ (and corresponding look-up tables) in a similar manner as shown in FIG. 11.

As mentioned before, additional non-linear white-box encodings may be added to the implementation after the techniques described in the examples above have been applied, in ways which will be familiar to the skilled person. Instead, or in addition to, adding non-linear encodings, further measures may be implemented to encode the XOR operations in the examples.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality and modules may be implemented as hardware and/or software. For example, the above-mentioned modules may be implemented as one or more software components for execution by a processor of the system. Alternatively, the above-mentioned modules may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program", as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of providing key information from a sender to one or more implementations of a white-box function, the method comprising one or more computer hardware processors carrying out the steps of:
   obtaining initial key information comprising a plurality of units that assume respective values;
   forming encoded key information from the initial key information, wherein the encoded key information comprises a plurality of encoded units that correspond to respective units of the initial key information, wherein said forming comprises,
      for each unit of the initial key information, selecting an encoding from a plurality of invertible encodings associated with said unit that are each invertible by each of said one or more implementations of the white-box function, wherein one or more of the invertible encoding is a secret shared between the sender and said one or more implementations of the white-box function, and
      encoding said value assumed by said unit with said selected encoding to form the corresponding encoded unit;
   providing the encoded key information to said one or more implementations of the white-box function; and
   providing information identifying the selected encodings to each implementation of the white-box function via a communication network.

2. The method of claim 1, wherein the initial key information comprises one or more cryptographic keys.

3. The method of claim 2, wherein each implementation of the white-box function is arranged to perform a symmetric cryptographic algorithm, said symmetric cryptographic algorithm comprising a plurality of rounds, wherein each of said one or more cryptographic keys is a round key for a corresponding round of said symmetric cryptographic algorithm.

4. The method of claim 3, comprising obtaining said one or more round keys from an initial key.

5. The method of claim 1, wherein for at least a first unit and a second unit of the initial key information the plurality of encodings associated said first unit is different from the plurality of encodings associated with said second unit.

6. A system comprising one or more computer hardware processors, said one or more hardware processors being configured to provide key information to one or more implementations of a white-box function by:
   obtaining initial key information comprising a plurality of units that assume respective values;
   forming encoded key information from the initial key information, wherein the encoded key information comprises a plurality of encoded units that correspond to respective units of the initial key information, wherein said forming comprises,
      for each unit of the initial key information, selecting an encoding from a plurality of invertible encodings associated with said unit that are each invertible by each of said implementations of the white-box function, wherein one or more of the invertible encoding is a secret shared between the system and said one or more implementations of the white-box function, and
      encoding said value assumed by said unit with said selected encoding to form the corresponding encoded unit:
   providing the encoded key information to said one or more implementations of the white-box function; and
   providing information identifying the selected encodings to each implementation of the white-box function via a communication network.

7. The system of claim 6, wherein the initial key information comprises one or more cryptographic keys.

8. The system of claim 7, wherein each implementation of the white-box function is arranged to perform a symmetric cryptographic algorithm, said symmetric cryptographic algorithm comprising a plurality of rounds, wherein each of said one or more cryptographic keys is a round key for a corresponding round of said symmetric cryptographic algorithm.

9. The system of claim 8, wherein said one or more processors are configured to obtain said one or more round keys from an initial key.

10. The system of claim 6, wherein for at least a first unit and a second unit of the initial key information the plurality of encodings associated said first unit is different from the plurality of encodings associated with said second unit.

11. A non-transitory tangible computer-readable medium storing a computer program for providing key information to one or more implementations of a white-box function, the computer program, when executed by one or more computer hardware processors, being arranged to cause the one or more processors to:
   obtain initial key information comprising a plurality of units that assume respective values;
   form encoded key information from the initial key information, wherein the encoded key information comprises a plurality of encoded units that correspond to respective units of the initial key information, wherein said forming comprises,
      for each unit of the initial key information, selecting an encoding from a plurality of invertible encodings associated with said unit that are each invertible by each of said one or more implementations of the white-box function, wherein one or more of the invertible encoding is a secret shared between the system and said one or more implementations of the white-box function, and
      encoding said value assumed by said unit with said selected encoding to form the corresponding encoded unit;
   provide the encoded key information to said one or more implementations of the white-box function; and
   provide information identifying the selected encodings to each implementation of the white-box function via a communication network.

* * * * *